(12) United States Patent
Hoshi et al.

(10) Patent No.: US 6,321,530 B1
(45) Date of Patent: Nov. 27, 2001

(54) EXHAUST GAS PURIFIER AND METHOD OF PURIFYING EXHAUST GAS FOR A HYBRID VEHICLE

(75) Inventors: Koichi Hoshi, Susono; Kazuhiro Sakurai, Gotenba; Takashi Watanabe, Susono, all of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/548,098

(22) Filed: Apr. 12, 2000

(30) Foreign Application Priority Data

Apr. 20, 1999 (JP) .................................................. 11-112437

(51) Int. Cl.⁷ ....................................................... F01N 3/00
(52) U.S. Cl. ................................ 60/274; 60/285; 60/276; 60/287; 60/292; 180/65.3; 180/65.2; 180/65.4
(58) Field of Search ............................... 60/280, 285, 297, 60/274, 292, 296, 324, 301, 287; 180/65.2, 65.3, 65.4

(56) References Cited

U.S. PATENT DOCUMENTS

| 5,327,991 | * | 7/1994 | Yoshida ............................... 180/65.4 |
| 5,396,764 | | 3/1995 | Rao et al. . |
| 5,398,503 | | 3/1995 | Danno et al. . |
| 5,517,820 | | 5/1996 | Kuroda et al. . |
| 5,522,219 | | 6/1996 | Orzel et al. . |
| 5,613,359 | | 3/1997 | Zahn et al. . |
| 5,693,877 | | 12/1997 | Ohsuga et al. . |
| 5,751,137 | * | 5/1998 | Kiuchi et al. ............................. 322/14 |
| 6,003,309 | | 12/1999 | Agustin et al. . |
| 6,012,284 | | 1/2000 | Tanaka et al. . |
| 6,018,943 | | 2/2000 | Martin et al. . |
| 6,032,753 | * | 3/2000 | Yamazaki et al. ................... 180/65.3 |
| 6,059,057 | * | 5/2000 | Yamazaki et al. ................... 180/65.2 |
| 6,079,204 | * | 6/2000 | Sun et al. ................................ 60/274 |
| 6,089,014 | | 7/2000 | Day et al. . |
| 6,109,025 | * | 8/2000 | Murata et al. .......................... 60/297 |
| 6,173,569 | * | 1/2001 | Kusada et al. .......................... 60/277 |

FOREIGN PATENT DOCUMENTS

| 0 430 269 A2 | 5/1991 | (EP) . |
| 61-57204 | 12/1986 | (JP) . |
| 1-257710 | 10/1989 | (JP) . |
| 2-173312 | 7/1990 | (JP) . |
| 9-117012 | 5/1997 | (JP) . |
| 10-61426 | 3/1998 | (JP) . |
| 10-246132 | 9/1998 | (JP) . |
| 10-331749 | 12/1998 | (JP) . |

* cited by examiner

Primary Examiner—Thomas Denion
Assistant Examiner—Binh Tran
(74) Attorney, Agent, or Firm—Kenyon & Kenyon

(57) ABSTRACT

A hybrid vehicle driven using power from an internal combustion engine and power from an auxiliary power source, includes an exhaust gas purification catalyst disposed in an exhaust passage of the engine. The catalyst stores oxygen and a power controller causes the engine to discharge exhaust gas including excess oxygen and causes the auxiliary power source to assist the engine in driving the vehicle when oxygen is to be stored in the exhaust gas purification catalyst. It is possible to supply the catalyst with exhaust gas containing excess oxygen while inhibiting the driveability from being adversely affected.

19 Claims, 10 Drawing Sheets

EXHAUST GAS PURIFIER AND METHOD OF PURIFYING EXHAUST GAS FOR A HYBRID VEHICLE

INCORPORATION BY REFERENCE

The disclosure of Japanese Patent Application No. HEI 11-112437 filed on Apr. 20, 1999 including the specification, drawings and abstract is incorporated herein by reference in its entirety.

BACKGROUND OF THE INVENTION

1. Field of the Invention

The present invention relates to an exhaust gas purifier and a method of purifying exhaust gas for a hybrid vehicle which is driven using power from an internal combustion engine and power from an auxiliary power source.

2. Description of the Related Art

Demands have been made in recent years to reduce the fuel injection amount of internal combustion engines and the amount of exhaust gas discharged therefrom. To meet such demands, hybrid vehicles have been developed having two power sources, an internal combustion engine and an electric motor.

For example, one such hybrid vehicle is known which has an internal combustion engine, a generator operated by power from the internal combustion engine, a battery for storing electric power generated by the generator, an electric motor operating through the electric power generated by the generator and/or the electric power stored in the battery, wheels mechanically coupled to a rotational shaft of the electric motor, and a power distribution mechanism for distributing the power from the internal combustion engine to the generator and the rotational shaft of the electric motor.

If the load applied to this hybrid vehicle is low, for example, at the time of take-off or when travelling at a low speed, the engine is prevented from operating and the electric power from the battery is applied to the electric motor. The electric motor causes its rotational shaft to rotate by means of the electric power from the battery.

In this case, the rotational shaft of the electric motor rotates by power generated by itself and the rotational torque of the rotational shaft is transmitted to the wheels. As a result the hybrid vehicle travels only by the power from the electric motor which operates by the power from the battery.

If the load applied to the hybrid vehicle is intermediate, for example, when travelling at a normal speed, the engine is operated and the power distribution mechanism distributes the power from the internal combustion engine to the generator and the rotational shaft of the electric motor. The generator generates electricity using the power distributed by the power distribution mechanism. The electric power generated by the generator is applied to the electric motor. The electric motor causes its rotational shaft to rotate by the electric power from the generator.

In this case, the rotational shaft of the electric motor rotates by the sum of the power generated by the electric motor itself and the power of the engine distributed from the power distribution mechanism, and the rotational torque of the rotational shaft is transmitted to the wheels. As a result the hybrid vehicle travels by the power from the engine and the power from the electric motor which operates by the electric power generated by means of the power from the engine.

If the load applied to the hybrid vehicle is high, for example, during acceleration, the engine is operated and the power distribution mechanism distributes the power from the engine to the generator and the rotational shaft of the electric motor. The generator generates electricity using the power distributed from the power distribution mechanism. The electric power generated by the generator is applied to the electric motor together with the electric power from the battery. The electric motor causes its rotational shaft to rotate by the sum of the electric power from the generator and the electric power from the battery.

In this case, the rotational shaft of the electric motor rotates by the sum of the power generated by the electric motor itself and the power distributed by the power distribution mechanism, and the rotational torque of the rotational shaft is transmitted to the wheels. As a result the hybrid vehicle travels by the electric power generated by means of the power from the engine, the power from the electric motor operating by the electric power from the battery, and the power from the engine.

If the hybrid vehicle is being decelerated or braked, power regeneration is carried out making use of the fact that the rotational torque of the wheels is transmitted to the rotational shaft of the electric motor. That is, since the wheels are mechanically coupled to the rotational shaft of the electric motor and the rotational torque of the wheels is transmitted to the rotational shaft of the electric motor when the vehicle is being decelerated or braked, the aforementioned hybrid vehicle is able to carry out so-called power regeneration wherein the electric motor is operated as a generator to convert the kinetic energy transmitted to the rotational shaft of the electric motor from the wheels into electric energy. The electric power regenerated by the electric motor is accumulated in the battery.

If it becomes necessary to charge the battery or warm up the engine in the aforementioned hybrid vehicle when the engine is to be stopped from operating, the engine is started and warmed up, and the power from the engine is transmitted to the generator through the power distribution mechanism so that the generator generates electricity.

Such a hybrid vehicle enables the engine to operate effectively and makes it possible to reduce the fuel consumption rate.

On the other hand, as for an internal combustion engine installed in a motor vehicle, it is also important to purify noxious gas components contained in exhaust gas such as hydrocarbon (HC), carbon monoxide (CO) and nitrogen oxides ($NO_x$).

To meet such a demand, there has been proposed an exhaust gas purifier with an exhaust gas purification catalyst such as a three-way catalyst, an oxidation catalyst, an $NO_x$ occlusion-reduction type catalyst and an $NO_x$ selective reduction type catalyst, and with an adsorbent which adsorbs unburnt fuel components in exhaust gas when it is at a temperature lower than a predetermined temperature range and which ejects the adsorbed unburnt fuel components when it is heated up to a temperature within the predetermined temperature range.

The exhaust gas purification catalyst mentioned above is activated at a temperature equal to or higher than a predetermined activation temperature (e.g. 300 to 500° C.) and can purify the noxious gas components in the exhaust gas flowing into the catalyst when its air-fuel ratio is within a desired range (a catalyst purification window).

The aforementioned adsorbent is made, for example, from a porous material mainly containing zeolite. If such an adsorbent is at a temperature lower than a temperature where unburnt fuel components start to gasify, the unburnt fuel components in their liquid state are trapped in pores. If the adsorbent is heated up and reaches or exceeds a temperature where the unburnt fuel components start to gasify, the unburnt fuel components trapped in the pores gasify and are desorbed from the adsorbent.

In the exhaust gas purifier having such a construction, when the exhaust gas purification catalyst is in its non-activated state, for example, during the cold-starting of the engine, the unburnt fuel components in exhaust gas are adsorbed to the adsorbent without being discharged into the atmosphere.

If the adsorbent is heated up and reaches or exceeds the temperature where the unburnt fuel components start to gasify, the unburnt fuel components adsorbed to the adsorbent start to be desorbed. At this moment, since at least a portion of the exhaust gas purification catalyst (e.g. an inlet of the exhaust gas purification catalyst) is in its activated state, the unburnt fuel components desorbed from the adsorbent are purified by the exhaust gas purification catalyst together with the unburnt fuel components contained in exhaust gas.

In the exhaust gas purifier as mentioned above, it is considered that a large amount of high-temperature exhaust gas flows into the adsorbent, for example, when the engine is operated at a high load. In such a case, there is a concern that the unburnt fuel components adsorbed to the adsorbent might be desorbed at a time and that the air-fuel ratio of the exhaust gas flowing into the exhaust gas purification catalyst might deviate from the catalyst purification window.

To solve such a problem, there is known an exhaust gas purifier for an internal combustion engine as disclosed in Japanese Patent Application Laid-Open No. HEI 10-61426. This exhaust gas purifier has an adsorbent and an exhaust gas purification catalyst disposed in an exhaust passage of the engine, the exhaust gas purification catalyst storing the oxygen in exhaust gas when the air-fuel ratio of the exhaust gas is higher than the stoichiometric air-fuel ratio and ejecting the stored oxygen when the air-fuel ratio of the exhaust gas becomes equal to or lower than the stoichiometric air-fuel ratio. The exhaust gas purifier is designed to operate the engine at a lean air-fuel ratio immediately after completion of the starting thereof.

In the exhaust gas purifier having such a construction, the engine is operated at a lean air-fuel ratio immediately after completion of the starting thereof so that oxygen is stored in the exhaust gas purification catalyst prior to desorption of the unburnt fuel components from the adsorbent and that the exhaust gas purification catalyst ejects oxygen upon desorption of the unburnt fuel components from the adsorbent. In this manner the exhaust gas purification catalyst is intended to converge the air-fuel ratio of exhaust gas into the catalyst purification window.

When the engine is operated at a lean air-fuel ratio, the power that can be outputted from the engine decreases compared with the operation in the neighborhood of the stoichiometric air-fuel ratio. For this reason there is a concern that the engine might not be able to output a power required by the driver and that the driveability might deteriorate.

SUMMARY OF THE INVENTION

The present invention has been made to solve the aforementioned problem and aims at improving both exhaust emission properties and driveability by providing a hybrid vehicle having an exhaust gas purification catalyst disposed in an exhaust passage of an internal combustion engine with an art that allows exhaust gas with an excess of oxygen to be supplied to the exhaust gas purification catalyst while inhibiting deterioration of driveability.

To solve the aforementioned problem, according to a first aspect of the present invention, there is proposed an exhaust gas purifier for a hybrid vehicle, including a hybrid mechanism that drives the vehicle using power from an internal combustion engine and power from an auxiliary power source, an exhaust gas purification catalyst disposed in an exhaust passage of the engine and demonstrating an oxygen storage capability to store oxygen contained in exhaust gas with an excess of oxygen when it flows into the catalyst and to eject the stored oxygen when exhaust gas with a low concentration of oxygen flows into the catalyst, and a power controller adapted to control the hybrid mechanism so that when oxygen is to be stored in the exhaust purifying catalyst, the engine discharges the exhaust gas with an excess of oxygen and the auxiliary power source assists the engine to drive the vehicle.

In the exhaust gas purifier having such a construction, the engine is operated at a lean air-fuel ratio to discharge exhaust gas with an excess of oxygen when oxygen is stored into the exhaust gas purification catalyst. At this moment the exhaust gas with an excess of oxygen flows into the exhaust gas purification catalyst, whereby the oxygen in the exhaust gas is stored in the exhaust gas purification catalyst.

The power outputted from the engine operated at a lean air-fuel ratio decreases in comparison with respect to the case where the engine is operated at an air-fuel ratio close to the stoichiometric air-fuel ratio. However, the exhaust gas purifier of the present invention compensates for a decrease in the power outputted from the engine by increasing a power outputted from the auxiliary power source. Thus the driving force of the vehicle does not decrease.

The exhaust gas purifier of the present invention may further include an adsorbent disposed in the exhaust passage upstream of the exhaust gas purification catalyst and adsorbent temperature detection that detects a temperature of the adsorbent. The adsorbent adsorbs unburnt fuel components in exhaust gas when it is at a temperature lower than a predetermined temperature range and ejects the adsorbed unburnt fuel components when it is heated up to a temperature within the predetermined temperature range.

In this case, the power controller reduces a fuel injection amount of the engine so that the exhaust gas with an excess of oxygen is discharged therefrom and controls the hybrid mechanism to increase a power outputted from the auxiliary power source, when a detection value of the adsorbent temperature detector is lower than the predetermined temperature range.

In the exhaust gas purifier having such a construction, the exhaust gas with an excess of oxygen flows into the exhaust gas purification catalyst when the adsorbent is at a temperature lower than the predetermined temperature range, that is, before the unburnt fuel components are desorbed from the adsorbent. Thus the oxygen in exhaust gas is stored in the exhaust gas purification catalyst.

If the adsorbent has thereafter been heated up to a temperature within the predetermined temperature range so that the unburnt fuel components adsorbed to the adsorbent are desorbed, the exhaust gas flowing into the exhaust gas purification catalyst mixes with the unburnt fuel components desorbed from the adsorbent and thus becomes rich. However, since oxygen is preliminarily stored in the exhaust gas purification catalyst, the exhaust gas purification catalyst does not undergo a deficiency in the oxygen required for purification of exhaust gas.

In addition, according to the exhaust gas purifier of the present invention, when the engine is operated at a lean air-fuel ratio to discharge exhaust gas with an excess of oxygen therefrom, the hybrid mechanism is controlled to increase the power outputted from the auxiliary power source. Therefore, even if the power outputted from the engine has decreased, the driving force of the vehicle does not decrease.

In a second aspect of the present invention, there is proposed an exhaust gas purifier for a hybrid vehicle, including a hybrid mechanism that drives the vehicle using power from an internal combustion engine and power from an auxiliary power source, a bypass passage for bypassing a main exhaust passage of the engine, an exhaust gas purification catalyst disposed in the main exhaust passage and demonstrating an oxygen storage capability to store oxygen contained in exhaust gas with an excess of oxygen when it flows into the catalyst and to eject the stored oxygen when exhaust gas with a low concentration of oxygen flows into the catalyst, an adsorbent disposed in the bypass passage to adsorb unburnt fuel components in exhaust gas when it is at a temperature lower than a predetermined temperature range and eject the adsorbed unburnt fuel components when it is heated up to a temperature within the predetermined temperature range, a flow passage switch for switching flow of exhaust gas so that the entire exhaust gas flows through the bypass passage when the exhaust gas purification catalyst is in its non-activated state and that most of the exhaust gas flows through the main exhaust passage and a negligible amount of exhaust gas flows through the bypass passage after activation of the exhaust gas purifier, and a power controller adapted to control the hybrid mechanism so that when oxygen is to be stored in the exhaust purifying catalyst, the internal combustion engine discharges the exhaust gas with an excess of oxygen and the auxiliary power source assists the internal combustion engine to drive the vehicle.

In the exhaust gas purifier having such a construction, when oxygen is stored into the exhaust gas purification catalyst, the engine is operated at a lean air-fuel ratio to discharge exhaust with an excess of oxygen. At this moment the exhaust gas with an excess of oxygen flows into the exhaust gas purification catalyst, so that the oxygen in exhaust gas is stored in the exhaust gas purification catalyst.

The power outputted from the engine operated at a lean air-fuel ratio decreases in comparison with respect to the case where it is operated at an air-fuel ratio close to the stoichiometric air-fuel ratio. However, the exhaust gas purifier of the present invention compensates for a decrease in the power from the engine using the power from the auxiliary power source. Thus the driving force of the vehicle does not decrease.

In a third aspect of the present invention, there is proposed an exhaust gas purifier for a hybrid vehicle, including a hybrid mechanism that drives the vehicle using power from an internal combustion engine and power from an auxiliary power source, a bypass passage that bypasses a main exhaust passage of the engine, an exhaust gas purification catalyst disposed in the main exhaust passage and demonstrating an oxygen storage capability to store oxygen contained in exhaust gas with an excess of oxygen when it flows into the catalyst and to eject the stored oxygen when exhaust gas with a low concentration of oxygen flows into the catalyst, an adsorbent disposed in the bypass passage to adsorb unburnt fuel components in exhaust gas when it is at a temperature lower than a predetermined temperature range and eject the adsorbed unburnt fuel components when it is heated up to a temperature within the predetermined temperature range, flow passage switching device that switches flow of exhaust gas so that the entire exhaust gas flows through the bypass passage when the exhaust gas purification catalyst is in its non-activated state and that most of the exhaust gas flows through the main exhaust passage and a negligible amount of exhaust gas flows through the bypass passage after activation of the exhaust gas purifier, adsorbent temperature detector that detects a temperature of the adsorbent, and a power controller adapted to control the hybrid mechanism so that when oxygen is to be stored in the exhaust purifying catalyst, the engine discharges the exhaust gas with an excess of oxygen and the auxiliary power source assists the engine to drive the vehicle.

In the exhaust gas purifier having such a construction, when the value detected by the adsorbent temperature detector is within the predetermined temperature range, that is, when the unburnt fuel components adsorbed to the adsorbent are desorbed, the engine is operated at a lean air-fuel ratio to discharge the exhaust gas with an excess of oxygen.

In this case, since the unburnt fuel components desorbed from the adsorbent mix with exhaust gas upstream of the exhaust gas purification catalyst, the air-fuel ratio of the exhaust gas flowing into the exhaust gas purification catalyst becomes rich with respect to the exhaust gas upstream of the adsorbent (the exhaust gas discharged from the engine). Nonetheless, since the exhaust gas discharged from the engine contains an excess of oxygen, the air-fuel ratio of the exhaust gas flowing into the exhaust gas purification catalyst does not become extremely rich. Hence the exhaust gas purification catalyst does not undergo a deficiency in the oxygen required for purification of exhaust gas.

BRIEF DESCRIPTION OF THE DRAWINGS

The foregoing and further objects, features and advantages of the present invention will become apparent from the following description of preferred embodiments with reference to the accompanying drawings, wherein.

DETAILD DESCRIPTION OF PREFERRED EMBODIMENTS

Concrete modes of implementation of an exhaust gas purifier according to the present invention will be described hereinafter with reference to the drawings.

(Embodiment 1)

Figure 1:
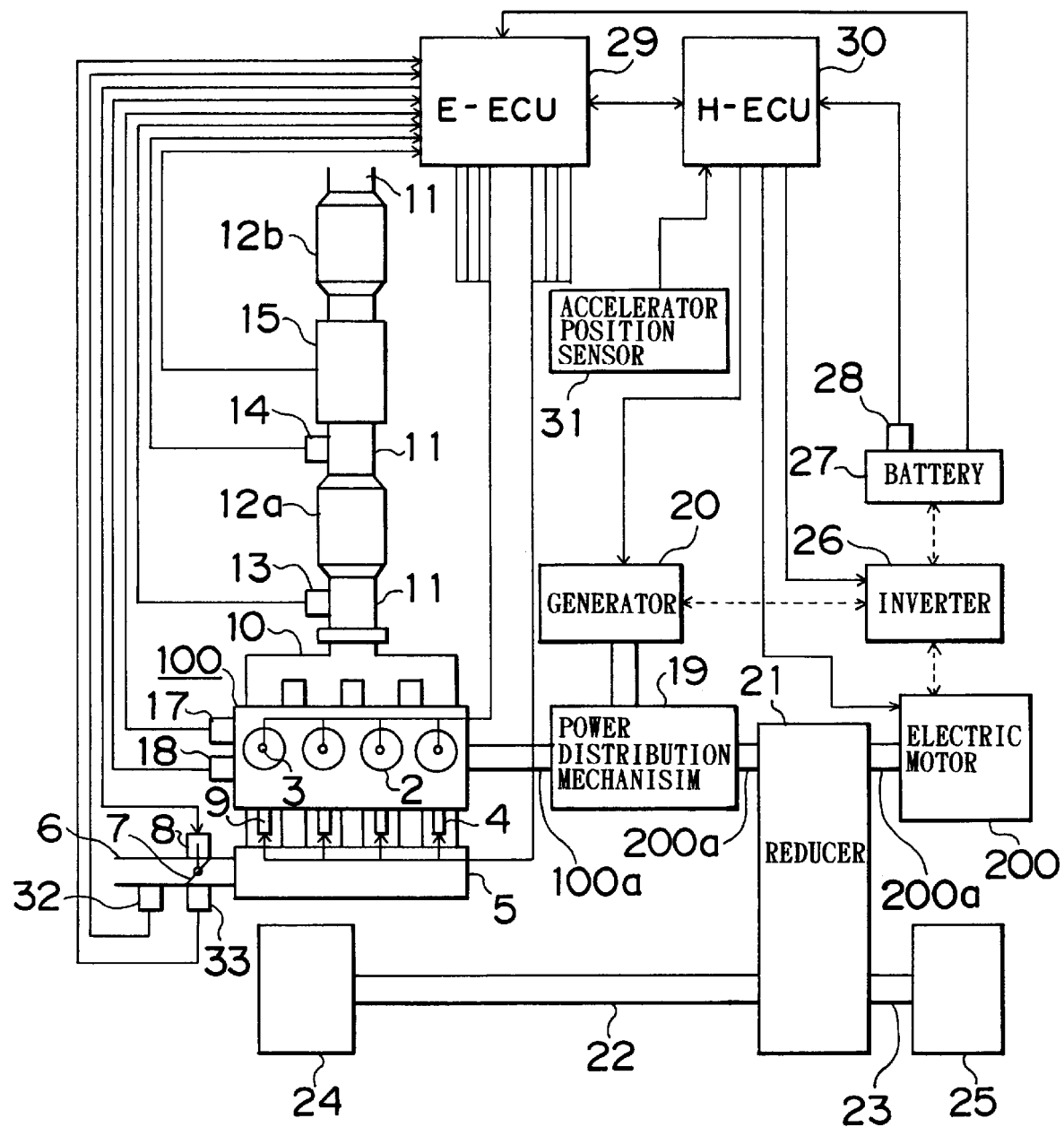
FIG. 1 shows the overall structure of a hybrid mechanism that is installed in a hybrid vehicle to which the present invention is applied.

FIG. 1 shows the overall structure of a hybrid mechanism that is installed in a hybrid vehicle to which the exhaust gas purifier of the present invention is applied.

The hybrid mechanism shown in FIG. 1 is provided with two driving sources, namely, an internal combustion engine 100 and an electric motor 200.

The engine 100 is a four-cycle four-cylinder gasoline engine. The engine 100 is fitted with ignition plugs 3 such that each of the ignition plugs 3 faces a corresponding one of combustion chambers (not shown) of respective cylinders 2. The engine 100 is fitted with a crank position sensor 17 and a coolant temperature sensor 18. The crank position sensor 17 outputs a pulse signal every time a crank shaft 100a, which is an output shaft of the engine, rotates by a predetermined angle (e.g. 30°). The coolant temperature sensor 18 outputs an electric signal corresponding to a temperature of the coolant flowing through a water jacket formed in the engine 100.

An intake branch pipe 4 is connected to the engine 100, and each branch of the intake branch pipe 4 communicates with a corresponding one of the combustion chambers of the respective cylinders 2 through an intake port (not shown). Each branch of the intake branch pipe 4 is fitted with a fuel injection valve 9 such that an injection hole thereof faces the intake port.

The intake branch pipe 4 is connected to a surge tank 5, which is connected to an intake pipe 6. Disposed in the midstream of the intake pipe 6 is a throttle valve 7 which adjusts a flow rate of the intake air flowing through the intake pipe 6.

The throttle valve 7 is fitted with an actuator 8 and a throttle position sensor 33. The actuator 8 is composed of a step motor or the like, and on-off drives the throttle valve 7 in accordance with an electric current applied. The throttle position sensor 33 outputs an electric signal corresponding to an opening degree of the throttle valve 7.

Provided in the intake pipe 6 upstream of the throttle valve 7 is an airflow meter 32 which outputs an electric signal corresponding to a mass of the air flowing through the intake pipe 6. On the other hand, an exhaust branch pipe 10 is connected to the engine 100, and each branch of the exhaust branch pipe 10 communicates with a corresponding one of the combustion chambers of the respective cylinders 2 through an exhaust port (not shown). The exhaust branch pipe 10 is connected to an exhaust pipe 11, which is connected downstream thereof to a muffler (not shown).

Disposed in the midstream of the exhaust pipe 11 are two exhaust gas purification catalysts 12a and 12b which purify noxious gas components in exhaust gas. While the exhaust gas purification catalyst 12a is disposed on the upstream side, the exhaust gas purification catalyst 12b is disposed on the downstream side. The exhaust gas purification atalyst 12a is designed to have a smaller capacity than the exhaust gas purification catalyst 12b, and to be heated up early to an activation temperature range in the case of cold-starting operation of the engine 100.

As the aforementioned exhaust gas purification catalysts 12a and 12b, a three-way catalyst, an occlusion-reduction type $NO_x$ catalyst, a selective reduction type catalyst, an oxidation catalyst and the like can be exemplified. However, the description of this embodiment will be made citing the three-way catalyst as an example. Hereinafter, the exhaust gas purification catalyst 12a will be referred to as the first three-way catalyst 12a, and the exhaust gas purification catalyst 12b will be referred to as the second three-way catalyst 12b.

The first and second three-way catalysts 12a and 12b are composed of a ceramic carrier and a catalytic layer. The ceramic carrier is made of lattice cordierite having a plurality of through holes along the direction of flow of exhaust gas. The surface of the ceramic carrier is coated with the catalytic layer. The catalytic layer is formed, for example, by having a noble metal catalytic substance of platinum-rhodium (Pt—Rh) type carried on the surface of porous alumina ($Al_2O_3$) having a multitude of pores.

The thus-constructed first and second three-way catalysts 12a and 12b are activated when they are at a temperature equal to or higher than a predetermined temperature (e.g. 300° C.). If the air-fuel ratio of inflow exhaust gas is within a predetermined range (catalyst purification window) in the vicinity of the stoichiometric air-fuel ratio, the first and second three-way catalysts 12a and 12b cause the hydrocarbon (HC) and carbon monoxide (CO) contained in exhaust gas to react with the oxygen ($O_2$) in exhaust gas to be oxidized into water ($H_2O$) and carbon dioxide ($CO_2$), and at the same time, cause the nitrogen oxides ($NO_x$) in exhaust gas to react with the hydrocarbon (HC) and carbon monoxide (CO) in exhaust gas to be reduced into water ($H_2O$), carbon dioxide ($CO_2$) and nitrogen ($N_2$).

In addition to the noble metal catalytic substance, a metal component such as cerium (Ce) is carried on the catalytic layer of the second three-way catalyst 12b. In this case, when the air-fuel ratio of the exhaust gas flowing into the second three-way catalyst 12b is greater than the stoichiometric air-fuel ratio (i.e. when the exhaust air-fuel ratio is lean), the second three-way catalyst 12b stores oxygen making use of the fact that cerium bonds to the oxygen in exhaust gas and forms ceric oxide (ceria). When the air-fuel ratio of the exhaust gas flowing into the second three-way catalyst 12b is equal to or smaller than the stoichiometric air-fuel ratio (i.e. when the exhaust air-fuel ratio is rich), the second three-way catalyst 12b ejects oxygen making use of the fact that ceric oxide is decomposed into oxygen and metal cerium. That is, the second three-way catalyst 12b has so-called oxygen storage capacity (OSC).

The exhaust pipe 11 upstream of the first three-way catalyst 12a is fitted with an upstream-side air-fuel ratio sensor 13 which outputs an electric signal corresponding to an air-fuel ratio of the exhaust gas flowing into the first three-way catalyst 12a.

The exhaust pipe 11 downstream of the first three-way catalyst 12a is fitted with a downstream-side air-fuel ratio sensor 14 which outputs an electric signal corresponding to an air-fuel ratio of the exhaust gas flowing out of the first three-way catalyst 12a.

The upstream-side air-fuel ratio sensor 13 and the downstream-side air-fuel ratio sensor 14 are formed, for example, of a solid electrolyte portion made of cylindrically calcined zirconia ($ZrO_2$), an external platinum electrode covering the outer surface of the solid electrolyte portion, and an internal platinum electrode covering the internal surface of the solid electrolyte portion. If an electric voltage is applied between the electrodes, the sensors output an electric current proportional to a concentration of the oxygen in exhaust gas (a concentration of an unburnt component when the air-fuel ratio is on the rich side with respect to the stoichiometric air-fuel ratio), in response to the displacement of oxygen ions.

Figure 2:
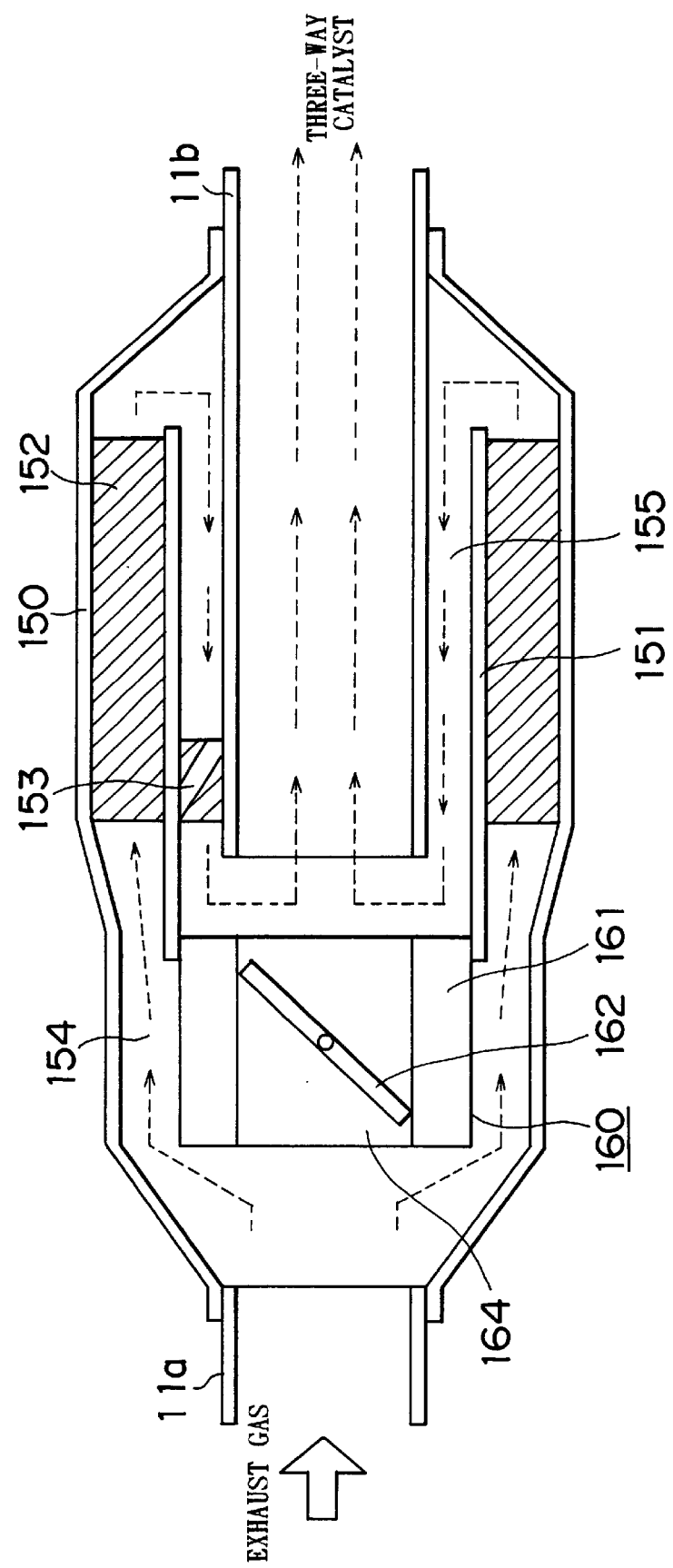
FIG. 2 is a diagram (1) showing the internal structure of an adsorption mechanism.
Figure 3:
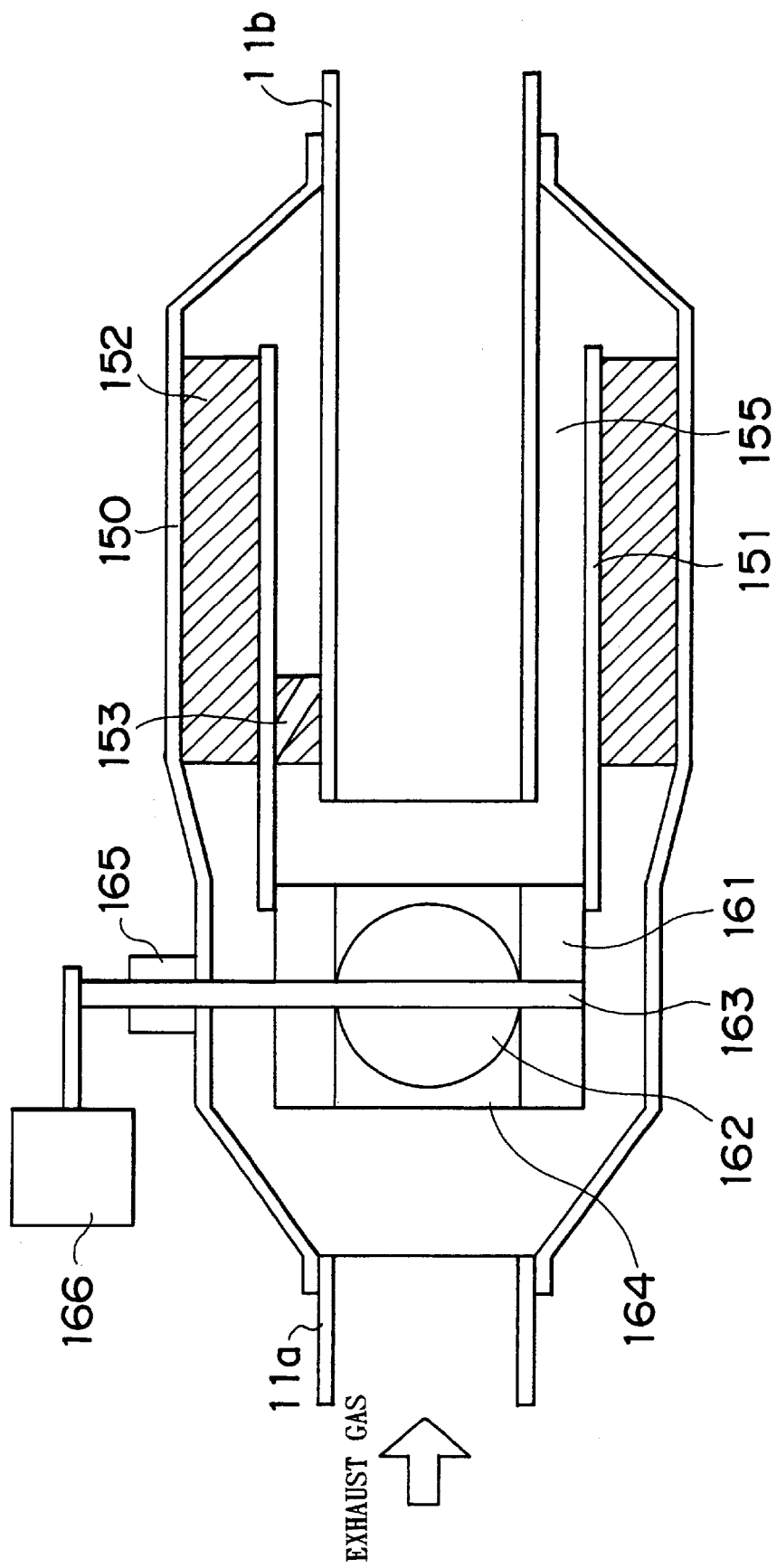
FIG. 3 is a diagram (2) showing the internal structure of an adsorption mechanism.

The exhaust pipe 11 is provided with an adsorption mechanism 15 at a location that is downstream of the downstream-side air-fuel ratio sensor 14 and upstream of the second three-way catalyst 12b. As shown in FIG. 2, the adsorption mechanism 15 is provided with an outer cylinder 150, an intermediate cylinder 151, and an annular adsorbent 152. The outer cylinder 150 has an inner diameter greater than an outer diameter of the exhaust pipe 11. The intermediate cylinder 151 has an inner diameter greater than the outer diameter of the exhaust pipe 11 and an outer diameter smaller than the inner diameter of the outer cylinder 150. The adsorbent 152 is disposed between the intermediate cylinder 151 and the outer cylinder 150.

In the outer cylinder 150, the exhaust pipe 11 is separated into an upstream-side exhaust pipe 11a and a downstream-side exhaust pipe 11b. The upstream-side exhaust pipe 11a and the downstream-side exhaust pipe 11b are connected to each other through the outer cylinder 150.

The downstream-side exhaust pipe 11b is held within the outer cylinder 150 such that an upstream-side open end thereof protrudes into the outer cylinder 150 and that a leading end portion thereof becomes an unfixed end. Accordingly, the intermediate cylinder 151 is held within the outer cylinder 150 such that one end thereof is fixed to the outer cylinder 150, the exhaust pipe 11 or a later-described valve mechanism 160, that the other end thereof is fixed to none of the outer cylinder 150, the exhaust pipe 11 and the valve mechanism 160, and that an upstream-side end portion thereof extends further upstream with respect to an upstream-side end portion of the downstream-side exhaust pipe 11b.

The reason for employing such a construction is as follows. The temperature of the outer cylinder 150 tends to be lower than those of the intermediate cylinder 151 and the downstream-side exhaust pipe 11b. If the outer cylinder 150 is fixed to the upstream-side exhaust pipe 11a and the downstream-side exhaust pipe 11b and if the outer cylinder 150 is fixed to both ends of the intermediate cylinder 151 or the upstream-side end portion of the downstream-side exhaust pipe 11b either directly or indirectly through the valve mechanism 160, it is likely that the adsorption mechanism break due to differences in thermal expansion among the outer cylinder 150, the intermediate cylinder 151 and the downstream-side exhaust pipe 11b. This leads to a deterioration in durability.

The adsorbent 152 is fixed to either the outer cylinder 150 or the intermediate cylinder 151 and can permit a difference in thermal expansion between the outer cylinder 150 and the intermediate cylinder 151, which results from a difference in temperature therebetween.

The adsorbent 152 is composed, for example, of a material mainly including zeolite. The adsorbent 152 adsorbs unburnt fuel components in exhaust gas at a temperature lower than a predetermined temperature, and ejects the adsorbed unburnt fuel components at a temperature equal to or higher than the predetermined temperature.

In order to improve vibration resistance of the downstream-side exhaust pipe 11b, holding members 153 are disposed at a plurality of locations in an annular space portion 155 that is formed between the intermediate cylinder 151 and the downstream-side exhaust pipe 11b.

Each of the holding members 153 is fixed to either the inner wall of the intermediate cylinder 151 or the outer wall of the downstream-side exhaust pipe 11b. That is, the holding member 153 ensures that the intermediate cylinder 151 and the downstream-side exhaust pipe 11b are not fixed to each other, and is able to absorb a difference in axial thermal expansion between the downstream-side exhaust pipe 11b and the intermediate cylinder 151. The valve mechanism 160 which opens and closes an upstream-side open end of the intermediate cylinder 151 is provided at the upstream-side open end. The valve mechanism 160 embodies flow passage switching device of the present invention and is composed of a two-way valve of butterfly type.

More specifically, the valve mechanism 160 is provided with a housing 161 fitted into the upstream-side open end of the intermediate cylinder 151, a passage 164 axially penetrating the housing 161, a valve body 162 opening and closing the passage 164, and a shaft fitted to the valve body 162.

The shaft 163 is rotatably supported at one end by the housing 161 and at the other end by a bearing 165 provided on the outer wall of the outer cylinder 150.

The other end of the shaft 163 is coupled to an actuator 166 through a link mechanism or the like. The actuator 166 is composed of a step motor or the like, and can on-off drive the shaft 163 and the valve body 162 in accordance with an electric current applied.

In the thus-constructed adsorption mechanism 15, if the first and second three-way catalysts 12a and 12b have not been activated, the actuator 166 is so controlled as to completely close the valve body 162 of the valve mechanism 160, as shown in FIG. 2.

In the case where the first and second three-way catalysts 12a and 12b have not been activated yet, an exhaust flow passage (a main exhaust passage) extending from the upstream-side exhaust pipe 11a through the passage 164 to the downstream-side exhaust pipe 11b is shut off. Hence, all the exhaust gas that has flown from the upstream-side exhaust pipe 11a into the adsorption mechanism 15 is introduced into an annular space portion 154 formed between the intermediate cylinder 151 and the outer cylinder 150, and passes through the adsorbent 152.

The exhaust gas that has passed through the adsorbent 152 collides with the inner wall of the outer cylinder 150, changes its direction of flow, and flows into the annular space portion 155 formed between the intermediate cylinder 151 and the downstream-side exhaust pipe 11b.

The exhaust gas that has been introduced into the space portion 155 flows through the space portion 155 from the downstream side to the upstream side of the adsorption mechanism 15. The exhaust gas that has flown through the space portion 155 collides with the valve mechanism 160, changes its direction of flow, and flows into the downstream-side exhaust pipe 11b. Hereinafter, the exhaust flow passage extending from the upstream-side exhaust pipe 11a through the space portions 154 and 155 to the downstream-side exhaust pipe 11b will be referred to as a bypass passage.

Figure 4:
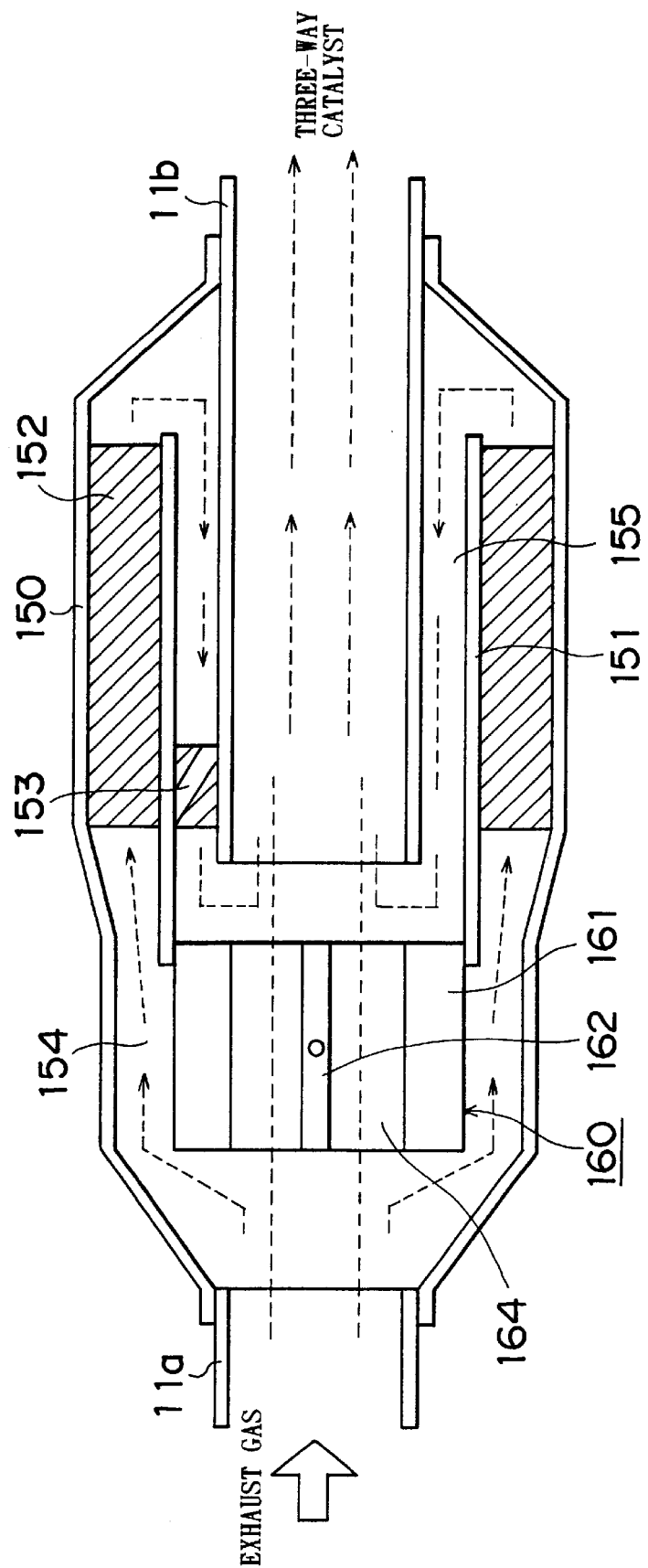
FIG. 4 shows operation of an adsorption mechanism.

In the adsorption mechanism 15, after the second three-way catalyst 12b has been activated, the actuator 166 is so controlled as to completely close the valve body 162 of the valve mechanism 160, as shown in FIG. 4.

In the adsorption mechanism 15, if the second three-way catalyst 12b has been activated, the main exhaust passage extending from the upstream-side exhaust pipe 11a through the passage 164 to the downstream-side exhaust pipe 11b is opened, and the bypass passage extending from the upstream-side exhaust pipe 11a through the space portions 154 and 155 to the downstream-side exhaust pipe 11b is opened.

The adsorption mechanism 15 shown in the present embodiment is so designed that the exhaust gas resistance of the bypass passage becomes greater than that of the main exhaust passage. Therefore most of the exhaust gas that has flown from the upstream-side exhaust pipe 11a into the adsorption mechanism 15 flows through the main exhaust passage, and the remainder of the exhaust gas flows through the bypass passage.

Referring back to FIG. 1, the crank shaft 100a of the engine 100 is coupled to a power distribution mechanism 19, which is mechanically connected to a generator 20 and a rotational shaft (motor rotational shaft) 200a of the electric motor 200.

The power distribution mechanism 19 is composed, for example, of a planetary gear which is provided with a planetary carrier rotatably supporting a pinion gear, a ring gear disposed outside the planetary carrier, and a sun gear disposed inside the planetary carrier. The rotational shaft of the planetary carrier is coupled to the crank shaft 100a, the rotational shaft of the ring gear is coupled to the motor rotational shaft 200a, and the rotational shaft of the sun gear is coupled to the generator 20.

A reducer 21 is coupled to the motor rotational shaft 200a of the electric motor 200. Wheels 24 and 25, which are drive wheels, are coupled to the reducer 21 through drive shafts 22 and 23 respectively.

The reducer 21, which is constructed by combining a plurality of gears, reduces a rotational speed of the motor rotational shaft 200a and transmits it to the drive shafts 22 and 23.

The generator 20 is electrically connected to an inverter 26, which is electrically connected to a battery 27 and the electric motor 200.

The generator 20 is composed of an electric motor of AC synchronization type. Upon application of an exciting current, the generator 20 generates electricity by converting the kinetic energy inputted from the engine 100 through the power distribution mechanism 19 into electric energy.

Upon application of a driving power from the battery 27 during the starting operation of the engine 100, the generator 20 operates as a starter motor of the engine 100.

The battery 27 is constructed by connecting a plurality of nickel-hydrogen batteries in series. The battery 27 is fitted with an SOC controller 28 which calculates a state of charge of the battery 27 from cumulative values of the charged and discharged quantities of electric current of the battery 27.

The electric motor 200 is composed of an electric motor of AC synchronization type. Upon application of the electric power generated by the generator 20 and/or the electric power of the battery 27, the electric motor 200 rotationally drives the motor rotational shaft 200a with a torque corresponding to the electric power applied.

The electric motor 200 operates as a generator at the time of deceleration of the vehicle and performs so-called power regeneration. That is, the electric motor 200 converts the kinetic energy transmitted from the wheels 24 and 25 through the drive shafts 22 and 23 and the reducer 21 to the motor rotational shaft 200 into electric energy.

The inverter 26 is a power conversion system constructed by combining a plurality of power transistors. The inverter 26 selectively switches application of the electric power generated by the generator 20 to the battery 27, application of the electric power generated by the generator 20 to the electric motor 200, application of the electric power accumulated in the battery 27 to the electric motor 200, and application of the electric power regenerated by the electric motor 200 to the battery 27.

The generator 20 and the electric motor 200 are composed of electric motors of AC synchronization type. Therefore, when applying the electric power generated by the generator 20 to the battery 27, the inverter 26 converts the AC voltage generated by the generator 20 into a DC voltage and then applies it to the battery 27. When applying the electric power of the battery 27 to the electric motor 200, the inverter 26 converts the DC voltage of the battery 27 into an AC voltage and then applies it to the electric motor 200. When applying the electric power regenerated by the electric motor 200 to the battery 27, the inverter 26 converts the AC voltage regenerated by the electric motor 200 into a DC voltage and then applies it to the battery 27.

The hybrid mechanism as mentioned above has an electronic control unit (E-ECU) 29 for controlling the engine 100 and an electronic control unit (H-ECU) 30 for generally controlling the entire hybrid mechanism. The electronic control units 29 and 30 are disposed in parallel with each other.

The H-ECU 30 is connected to an accelerator position sensor 31 and the SOC controller 28 through electric wires. The acceleration position sensor 31 outputs an electric signal corresponding to an operated amount of an accelerator pedal (not shown). An output signal (an accelerator opening degree signal) from the accelerator position sensor 31 and an output signal from the SOC controller 28 (a signal indicative of a state of charge of the battery 27) can be inputted to the H-ECU 30.

The H-ECU 30 is connected to the generator 20, the inverter 26 and the electric motor 200 through electric wires, and to the E-ECU 29 through a bidirectional communication line. The H-ECU 30 can control the generator 20, the inverter 26 and the electric motor 200 based on output signals from the accelerator position sensor 31, the SOC controller 28 and the like, and control the engine 100 through the E-ECU 29.

For example, if an ignition switch has been turned on, the H-ECU 30 starts the engine 100. More specifically, the H-ECU 30 controls the inverter 26 such that the battery 27 applies a driving power to the generator 20, and thus operates the generator 20 as a starter motor. Also, the H-ECU 30 controls the E-ECU 29 to operate an ignition plug 3, the throttle valve 7 and the fuel injection valve 9.

In this case, in the power distribution mechanism 19, while the sun gear coupled to the generator 20 rotates, the ring gear coupled to the wheels 24 and 25 is stopped. Therefore, substantially the entire rotational torque of the sun gear is transmitted to the planetary carrier.

The planetary carrier of the power distribution mechanism 19 is coupled to the crank shaft 100a of the engine 100. Therefore, if the planetary carrier rotates upon receiving the rotational torque from the sun gear, the crank shaft 100a rotates accordingly. At this moment, the E-ECU 29 operates the ignition plug 3, the throttle valve 7 and the fuel injection valve 9, whereby the cranking of the engine 100 is achieved and the engine 100 is started.

After the starting of the engine 100, if the temperature of coolant becomes equal to or higher than a predetermined temperature, the H-ECU 30 determines that the engine 100 has been warmed up, and stops operation of the engine 100 through the E-ECU 29.

If the vehicle has stopped with the ignition switch on, the H-ECU 30 controls the E-ECU 29 to stop operation of the engine 100 and controls the inverter 26 to stop rotation of the electric motor 200.

However, in the case where the output signal from the SOC controller 28 (the signal indicative of a state of charge of the battery 27) has dropped below a predetermined reference value when the vehicle is stopped, or in the case where it has become necessary to operate auxiliaries such as a compressor for a room air conditioner which is driven using part of the torque outputted from the engine 100, or in the case where it has become necessary to warm up the engine 100 or the exhaust gas purification system, the engine 100 is prohibited from being stopped or the engine 100 that has once been stopped is restarted.

In the case where the vehicle takes off, the H-ECU 30 controls the inverter 26 such that the battery 27 applies a driving power to the electric motor 200. If the driving power is supplied from the battery 27 to the electric motor 200, the motor rotational shaft 200a of the electric motor 200 rotates. Then the rotational torque of the motor rotational shaft 200a is transmitted to the wheels 24 and 25 through the reducer 21 and the drive shafts 22 and 23, whereby the vehicle takes off.

At the time of take-off of the vehicle, in the case where the output signal value of the SOC controller 28 is below the predetermined reference value, in the case where it has become necessary to operate auxiliaries such as the compressor for the air conditioner, or in the case where it has become necessary to warm up the engine 100 or the exhaust gas purification system, the H-ECU 30 starts the engine 100.

At the time of take-off of the vehicle, if the engine 100 is started to charge the battery 27, operate the auxiliaries, or warm up the engine 100 or the exhaust gas purification system, the H-ECU 30 controls the inverter 26 such that the battery 27 applies an exciting current to the generator 20, and operates the generator 20 as a generator.

In this case, the crank shaft 100a rotates due to the torque outputted from the engine 100. The rotational torque of the crank shaft 100a is transmitted to the planetary carrier of the power distribution mechanism 19 and then distributed to the sun gear and the ring gear.

The rotational torque that has been distributed to the sun gear from the planetary carrier is transmitted to the generator 20 that is coupled to the sun gear. The generator 20 generates electricity by converting the kinetic energy transmitted from the sun gear into electric energy. The electric power generated by the generator 20 is distributed to the battery 27 and the electric motor 200 by the inverter 26.

The rotational torque that has been distributed to the ring gear from the planetary carrier is transmitted to the motor rotational shaft 200a that is coupled to the ring gear.

Consequently, the motor rotational shaft 200a rotates by the sum of the torque outputted from the electric motor 200 and the rotational torque transmitted from the ring gear. The rotational torque of the motor rotational shaft 200a is transmitted to the wheels 24 and 25 through the drive shafts 22 and 23 respectively.

If the vehicle has been switched from its take-off state to its normal running state, the H-ECU 30 controls the E-ECU 29 such that the torque outputted from the engine 100 becomes equal to a desired target torque. At the same time, the H-ECU 30 stops the supply of a driving power from the battery 27 to the electric motor 200, and controls the inverter 26 such that the battery 27 applies an exciting current to the generator 20.

More specifically, the H-ECU 30 calculates a driving torque required by the driver (hereinafter referred to as a driving torque requirement) from an output signal from the accelerator position sensor 31 (an accelerator opening degree) and an output signal from a vehicle speed sensor (not shown) (a vehicle speed). The H-ECU 30 then determines a torque to be outputted from the engine 100 (hereinafter referred to as an engine torque requirement) and a torque to be outputted from the electric motor 200 (hereinafter referred to as a motor torque requirement) for the purpose of meeting the driving torque requirement.

The H-ECU 30 sends the engine torque requirement to the E-ECU 29 and controls the inverter 26 in accordance with the motor torque requirement. In this case, the H-ECU 30 controls a rotational speed of the generator 20 by adjusting an exciting current to be applied to the generator 20, thus controlling an engine speed of the engine 100.

For example, the engine torque requirement that has been sent from the H-ECU 30 to the E-ECU 29 is a value which uses an intake air amount of the engine 100 and an engine speed as parameters. In this case, the H-ECU 30 has a map showing a relation among intake air amount, engine speed and engine torque, uses the map to specify an intake air amount and an engine speed that correspond to a desired engine torque, and sends the specified intake air amount and engine speed to the E-ECU 29 as an engine torque requirement.

After having received the engine torque requirement from the H-ECU 30, the E-ECU 29 determines a throttle opening degree, a fuel injection amount, a fuel injection timing and an ignition timing according to the engine torque requirement, and then controls the actuator 8, the fuel injection valve 9 and the ignition plug 3.

If it becomes necessary to charge the battery 27 when the vehicle is in its normal running state, the H-ECU 30 controls the E-ECU 29 to increase the torque outputted from the engine 100 and controls the inverter 26 to increase the exciting current applied to the generator 20 by the battery 27. Thus the H-ECU 30 increases the generated amount of electric power while ensuring the driving torque requirement.

If the vehicle is in its accelerated state, the H-ECU 30 calculates a driving torque requirement, an engine torque requirement and a motor torque requirement as is the case with the aforementioned normal running state. Then the H-ECU 30 controls the engine 100 through the E-ECU 29 and controls the electric motor 200 through the inverter 26.

The H-ECU 30 controls the inverter 26 to apply the electric power of the battery 27 to the electric motor 200 in addition to the electric power generated by the generator 20, and increases the torque outputted from the electric motor 200.

If the vehicle is in its decelerated or braked state, the H-ECU 30 controls the E-ECU 29 to stop operation of the engine 100 (to stop fuel injection control and ignition control), and controls the inverter 26 to stop operation of the generator 20 and operation of the electric motor 200.

The H-ECU 30 then controls the inverter 26 such that the battery 27 applies an exciting current to the electric motor 200, thus operating the electric motor 200 as a generator. Thus the H-ECU 30 performs power regeneration by converting the kinetic energy transmitted from the wheels 24 and 25 to the motor rotational shaft 200a through the drive shafts 22 and 23 and the reducer 21 into electric energy. The inverter 26 charges the battery 27 with the electric power regenerated by the electric motor 200.

The E-ECU 29 is connected to various sensors such as the upstream-side air-fuel ratio sensor 13, the downstream-side air-fuel ratio sensor 14, the crank position sensor 17, the coolant temperature sensor 18, the airflow meter 32 and the throttle position sensor 33 through electric wires. Hence, output signals from the aforementioned sensors can be inputted to the E-ECU 29.

The E-ECU 29 is connected to the ignition plug 3, the actuator 8, the fuel injection valve 9 and the valve mechanism 160 (the actuator 166) of the adsorption mechanism 15 through electric wires. Based on the output signals from the aforementioned sensors and the engine torque requirement from the H-ECU 30, the E-ECU 29 performs ignition control, throttle control, fuel injection control and the control of the adsorption mechanism 15.

For example, when performing fuel injection control, the E-ECU 29 determines a fuel injection amount (TAU) according to a fuel injection amount calculation formula as shown below.

$$TAU=TP*FWL*(FAF+FG)*[FASE+FAE+FOTP+FDE(D)]*FFC+TAUV$$

(TP: base injection amount, FWL: warm-up gain, FAF: air-fuel ratio feedback correction factor, FG: air-fuel ratio learning factor, FASE: post-starting gain, FAE: acceleration gain, FOTP: OTP gain, FDE(D): deceleration gain (loss), FFC: fuel-cut recovery correction factor, TAUV: invalid injection time)

In this case, the E-ECU 29 judges an operating state of the engine 100 using output signal values from the various sensors as parameters. Based on the judged operating state of the engine and the maps preliminarily stored in a ROM and the like in the E-ECU 29, the E-ECU 29 calculates the base injection amount (TP), the warm-up gain (FWL), the post-starting gain (FASE), the acceleration gain (FAE), the OTP gain (FOTP), the deceleration gain (FDE(D)), the fuel-cut recovery correction factor (FFC), the invalid injection time (TAUV) and the like.

In accordance with the following procedure, the E-ECU 29 calculates the air-fuel ratio feedback correction factor (FAF). That is, the E-ECU 29 first determines whether or not the condition for air-fuel ratio feedback control is established.

For example, the condition for air-fuel ratio feedback control may be that the coolant temperature is equal to or higher than a predetermined temperature, that the engine 100 is in its non-starting state, that the post-starting gain correction for fuel injection amount is in its non-execution state, that the warm-up gain correction for fuel injection amount is in its non-execution state, that the acceleration gain correction for fuel injection amount is in its non-execution state, that the OTP gain correction for preventing exhaust system components such as the first and second three-way catalysts 12*a* and 12*b* from being heated is in its non-execution state, or that the fuel-cut control is in its non-execution state.

If the aforementioned condition for air-fuel ratio feedback control is not established, the E-ECU 29 sets the air-fuel ratio feedback correction factor (FAF) to "1.0" and calculates the fuel injection amount (TAU).

On the other hand, if the aforementioned condition for air-fuel ratio feedback control is established, the output signal from the upstream-side air-fuel ratio sensor 13 is inputted to the E-ECU 29. Based on the inputted output signal and a response delay time of the upstream-side air-fuel ratio sensor 13, the E-ECU 29 determines whether the actual air-fuel ratio of exhaust gas is lean or rich with respect to the stoichiometric air-fuel ratio.

If it has been determined that the actual air-fuel ratio of exhaust gas is rich with respect to the stoichiometric air-fuel ratio, the E-ECU 29 corrects the air-fuel ratio feedback correction factor (FAF) to decreasingly correct the fuel injection amount (TAU). If it has been determined that the actual air-fuel ratio of exhaust gas is lean with respect to the stoichiometric air-fuel ratio, the E-ECU 29 corrects the air-fuel ratio feedback factor (FAF) to increasingly correct the fuel injection amount (TAU).

The E-ECU 29 performs upper-limit and lower-limit guard processings for the air-fuel ratio feedback correction factor (FAF) calculated according to the aforementioned procedure. The E-ECU 29 assigns the air-fuel ratio feedback correction factor (FAF) that has undergone the guard processings to the fuel injection amount calculation formula, thus calculating the fuel injection amount (TAU).

In parallel with the air-fuel ratio feedback control (first air-fuel ratio feedback control) based on the output signal from the upstream-side air-fuel ratio sensor 13 as mentioned above, the E-ECU 29 may perform the air-fuel ratio feedback control (second air-fuel ratio feedback control) based on the output signal from the downstream-side air-fuel ratio sensor 14.

For example in the second air-fuel ratio feedback control, the E-ECU 29 compares an output signal value of the downstream-side air-fuel ratio sensor 14 with a predetermined reference voltage and determines whether the air-fuel ratio of the exhaust gas that has flown out of the first three-way catalyst 12*a* is lean or rich. Based on the result of the determination, the E-ECU 29 corrects the reference value for determining richness/leanness in the first air-fuel ratio feedback control, the correction amount for the air-fuel ratio feedback correction factor (FAF) and the like, and inhibits exhaust emission properties from deteriorating due to the inconsistency in output characteristics of the upstream-side air-fuel ratio sensor 13 and a time-dependent change in output characteristics of the upstream-side air-fuel ratio sensor 13.

In controlling the adsorption mechanism 15, the output signal from the coolant temperature sensor 18 (coolant temperature) is inputted to the E-ECU 29 at the time of the starting of the engine 100. Based on the output signal and a predetermined map, the E-ECU 29 calculates a required time from the starting of the engine 100 to the activation of the second three-way catalyst 12*b* (hereinafter referred to as a catalyst activation time).

While the elapsed time from the starting of the engine 100 is shorter than the catalyst activation time, that is, while the second three-way catalyst 12*b* is not activated, the E-ECU 29 outputs a control signal to the actuator 166 to completely close the valve body 162 of the valve mechanism 160 (to shut off the main exhaust passage in the adsorption mechanism 15).

In completely closing the valve body 162 of the valve mechanism 160, all the exhaust gas that has been discharged from the engine 100 flows into the second three-way catalyst 12*b* through the adsorbent 152 and the bypass passage in the adsorption mechanism 15. As a result, the unburnt fuel components contained in exhaust gas is adsorbed to the adsorbent 152 without being discharged into the atmosphere.

If the elapsed time from the starting of the engine 100 has reached or exceeded the catalyst activation time, that is, if the second three-way catalyst 12*b* has been activated, the E-ECU 29 outputs a control signal to the actuator 166 to completely open the valve body 162 of the valve mechanism 160 (to open the main exhaust passage in the adsorption mechanism 15).

In completely opening the valve body 162 of the valve mechanism 160, both the main exhaust passage and the bypass passage are open in the adsorption mechanism 15. Therefore, the exhaust gas that has been discharged from the engine 100 passes through both the main exhaust passage and the bypass passage and flows into the second three-way catalyst 12*b*.

In the adsorption mechanism 15 shown in this embodiment, the bypass passage has an exhaust gas inflow portion and an exhaust gas outflow portion which are located close to each other. Therefore, the exhaust gas pressure in the vicinity of the exhaust gas inflow portion is not appreciably different from the exhaust gas pressure in the vicinity of the exhaust gas outflow portion. Also, the phase of pulsation of the exhaust gas flowing through the main exhaust passage in the vicinity of the exhaust gas inflow portion is not appreciably different from the phase of pulsation of the exhaust gas flowing through the main exhaust passage in the vicinity of the exhaust gas outflow portion. As a result, only a negligible amount of the exhaust gas that has been discharged from the engine 100 flows into the second three-way catalyst 12b through the bypass passage. Most of the exhaust gas flows into the second three-way catalyst 12b through the main exhaust passage.

Thus, if the amount of exhaust gas flowing through the bypass passage is negligible, the amount of exhaust gas flowing through the adsorbent 152 is also negligible accordingly. Therefore, the temperature of the adsorbent 152 rises gently, and the unburnt fuel components that have been adsorbed to the adsorbent 152 are gradually desorbed.

The unburnt fuel components that have been desorbed from the adsorbent 152 flow into the second three-way catalyst 12b together with the exhaust gas. At this moment, the air-fuel ratio of the exhaust gas flowing into the second three-way catalyst 12b is smaller than (rich with respect to) the air-fuel ratio of the exhaust gas discharged from the engine 100, because of the addition of the unburnt fuel components that have been desorbed from the adsorbent 152.

If the exhaust gas having such a rich air-fuel ratio has flown into the second three-way catalyst 12b, the oxygen that has been stored by the OSC of the second three-way catalyst 12b is ejected, and the air-fuel ratio of the exhaust gas in the second three-way catalyst 12b becomes equal to a desired air-fuel ratio (an air-fuel ratio within the catalyst purification window). Thus, in addition to the aforementioned unburnt fuel components, the carbon monoxide (CO) and nitrogen oxides ($NO_x$) in exhaust gas are purified reliably.

However, in order to utilize the OSC of the second three-way catalyst 12b, oxygen needs to be stored in the second three-way catalyst 12b before the unburnt fuel components are desorbed from the adsorbent 152. In order for the second three-way catalyst 12b to store oxygen, the engine 100 needs to be operated at a lean air-fuel ratio to supply the second three-way catalyst 12b with the exhaust gas including an excess of oxygen (hereinafter referred to as the lean exhaust gas).

If the engine 100 is operated at a lean air-fuel ratio, the torque that can be outputted from the engine 100 decreases in comparison with the case where the engine 100 is operated at a desired air-fuel ratio close to the stoichiometric air-fuel ratio. Consequently there arises a problem regarding a decrease in driving force of the vehicle.

In view of this, according to the present embodiment, when the engine 100 is operated at a lean air-fuel ratio to supply the second three-way catalyst 12b with lean exhaust gas, the torque outputted from the electric motor 200 serving as an auxiliary power source is increased. In this manner, the decrease in torque of the engine 100 is compensated for.

More specifically, the E-ECU 29 and the H-ECU 30 execute application programs as shown below, for the purpose of supplying the second three-way catalyst 12b with lean exhaust gas.

Figure 5:
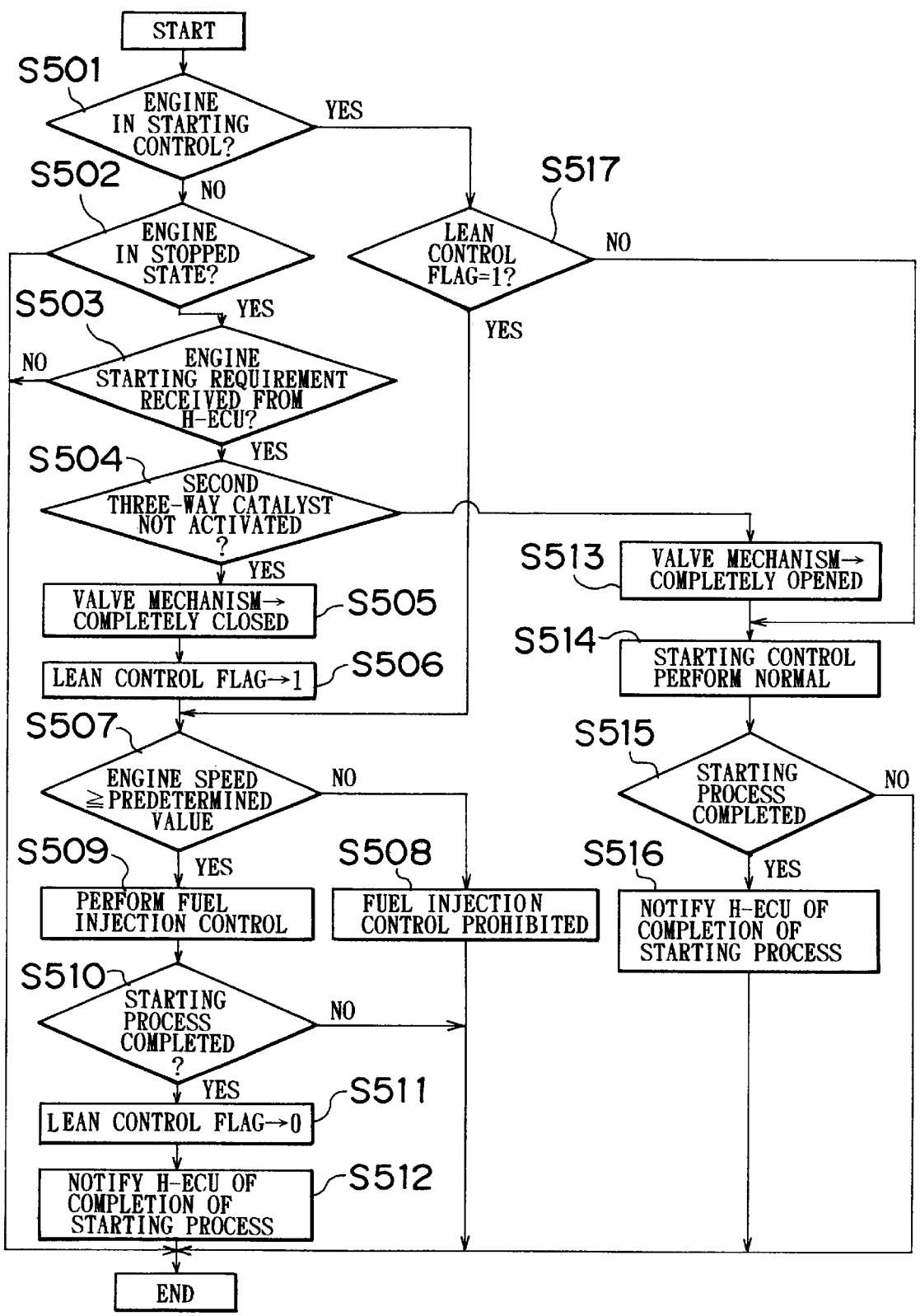
FIG. 5 is a flowchart showing an engine starting control routine.

First of all, the E-ECU 29 executes an engine starting control routine as shown in FIG. 5. This engine starting control routine is repeatedly executed at intervals of a predetermined length of time, when the ignition switch (not shown) is on. This routine is preliminarily stored in the ROM or the like of the E-ECU 29.

In the aforementioned engine starting control routine, first in step S501, the E-ECU 29 determines whether or not the starting control of the engine 100 is already in its execution state.

If it is determined in step S501 that the starting control of the engine 100 is in its non-execution state, the E-ECU 29 proceeds to step S502 and determines whether or not the engine 100 is in its stopped state.

If it is determined in step S502 that the engine 100 is in its stopped state, the E-ECU 29 proceeds to step S503 and determines whether or not it has received an engine starting requirement from the H-ECU 30.

If it is determined in step S503 that the engine starting requirement has not been received from the H-ECU 30, the E-ECU 29 temporarily terminates the execution of the present routine. If it is determined in step S503 that the engine starting requirement has been received from the H-ECU 30, the E-ECU 29 proceeds to step S504.

In step S504, the E-ECU 29 determines whether or not the second three-way catalyst 12b is in its non-activated state. It is determined whether or not the second three-way catalyst 12b is in its non-activated state, according to the following methods. For example, the second three-way catalyst 12b is fitted with a temperature sensor for detecting a catalyst bed temperature of the second three-way catalyst 12b, and it is determined whether or not the temperature detected by the temperature sensor is lower than a predetermined activation temperature. Alternatively, the catalyst bed temperature of the second three-way catalyst 12b is estimated from a temperature of the coolant for the engine 100 (a temperature detected by the coolant temperature sensor 18), and it is determined whether or not the estimated temperature is lower than a predetermined activation temperature.

If it is determined in step S504 that the second three-way catalyst 12b is in its non-activated state, the E-ECU 29 proceeds to step S505. The E-ECU 29 then judges that the unburnt fuel components contained in the exhaust gas discharged from the engine 100 need to be adsorbed to the adsorbent 152 of the adsorption mechanism 15, and controls the actuator 166 to completely close the valve body 162 of the valve mechanism 160 in the adsorption mechanism 15 (to shut off the main exhaust passage).

The E-ECU 29 then proceeds to step S506 and sets 1 to a lean control flag storage area which is set in a predetermined area of the memory commonly shared by the E-ECU 29 and the H-ECU 30.

In the case where the second three-way catalyst 12b needs to be supplied with lean exhaust gas to store oxygen in the second three-way catalyst 12b, 1 is set in the lean control flag storage area. In the case where the supply of the lean exhaust gas to the second three-way catalyst 12b has been completed, the lean control flag storage area is reset to 0.

For example, the case where the second three-way catalyst 12b needs to be supplied with lean exhaust gas to store oxygen in the second three-way catalyst 12b refers to a case where the second three-way catalyst 12b is in its non-activated state and where the unburnt fuel components contained in the exhaust gas discharged from the engine 100 need to be adsorbed to the adsorbent 152.

The reason for this is as follows. If the unburnt fuel components are adsorbed to the adsorbent 152, the air-fuel ratio of the exhaust gas flowing into the second three-way catalyst 12b is considered to become rich with respect to the catalyst purification window when the unburnt fuel components are desorbed from the adsorbent 152. Accordingly, it is necessary to cause the air-fuel ratio of the exhaust gas in the second three-way catalyst 12b to converge into the catalyst purification window by having oxygen stored in the second three-way catalyst 12b.

Referring back to FIG. 5, the E-ECU 29 proceeds to step S507 after having performed the processing of step S506. The E-ECU 29 calculates a rotational speed of the crank shaft 100a (an engine speed) based on a time interval at which the crank position sensor 17 outputs pulse signals, and then determines whether or not the engine speed has reached or exceeded a predetermined value.

The engine speed mentioned herein represents an engine speed when the crank shaft 100a is rotated only by the torque outputted from the generator 20 serving as a starter motor.

If it is determined in step S507 that the engine speed has not reached or exceeded the predetermined engine speed, the E-ECU 29 proceeds to step S508 and prohibits the execution of fuel injection control.

After having performed the processing of step S508, the E-ECU 29 temporarily terminates the execution of the present routine and executes it again after the lapse of a predetermined length of time. In this case, the E-ECU 29 judges in step S501 that the starting control of the engine 100 is already in its execution state, and then proceeds to step S517.

The E-ECU 29 determines in step S517 whether or not "1" is set in the lean control flag storage area. In this case, since "1" is stored in the lean control storage area, the E-ECU 29 determines that "1" is set in the lean control flag storage area, and then proceeds to step S507.

In step S507, the E-ECU 29 determines again whether or not the engine speed has reached or exceeded the predetermined rotational speed. If it is determined that the engine speed has reached or exceeded the predetermined engine speed, the E-ECU 29 proceeds to step S509 and starts performing fuel injection control.

The E-ECU 29 determines in step S510 whether or not the starting of the engine 100 has been completed. For example, as a method of determining whether or not the starting of the engine 100 has been completed, the determination is made based on whether or not the engine speed has reached or exceeded a predetermined engine speed (e.g. 800 rpm).

If it is determined in step S510 that the starting of the engine 100 has not been completed, the E-ECU 29 temporarily terminates the execution of the present routine and executes it again after the lapse of a predetermined length of time. In this case, after having sequentially performed the processings of steps S501, S517 and S507, the E-ECU 29 performs fuel injection control in step S509 and then determines in step S510 whether or not the starting of the engine 100 has been completed.

If it is determined in step S510 that the starting of the engine 100 has been completed, the E-ECU 29 proceeds to step S511 and resets 1 that has been set in the lean control flag storage area to 0.

The E-ECU 29 then proceeds to step S512 and sends a signal indicative of completion of the starting of the engine 100 to the H-ECU 30. The E-ECU 29 then terminates the execution of the present routine.

On the other hand, if it is determined in step S504 that the second three-way catalyst 12b is not in its non-activated state, that is, if it is determined that the second three-way catalyst 12b is already in its activated state, the E-ECU 29 proceeds to step S513.

In step S513, since the exhaust gas discharged from the engine 100 can be purified in the second three-way catalyst 12b, the E-FCU 29 judges that the unburnt fuel components contained in exhaust gas need not be adsorbed to the adsorbent 152 of the adsorption mechanism 15, and controls the actuator 166 to completely open the valve body 162 of the valve mechanism 160 in the adsorption mechanism 15 (to open the main exhaust passage).

In step S514, the E-ECU 29 performs normal starting control. In performing normal starting control, the E-ECU 29 performs fuel injection control and ignition control immediately after the starting of so-called cranking wherein the crank shaft 100a is rotated, for example, by the generator 20 serving as a starter motor. Thus the E-ECU 29 makes an attempt at early completion of the starting of the engine 100.

The E-ECU 29 determines in step S515 whether or not the starting of the engine 100 has been completed.

If it is determined in step S515 that the starting of the engine 100 has not been completed, the E-ECU 29 temporarily terminates the execution of the present routine and executes it again after the lapse of a predetermined length of time.

In this case, the E-ECU 29 judges in step S501 that the starting control of the engine 100 is in its execution state, and then judges in step S517 that 1 is not set in the lean control flag storage area. The E-ECU 29 again performs the processings of steps S514 and S515.

If it is determined in step S515 that the starting of the engine 100 has been completed, the E-ECU 29 proceeds to step S516 and sends a signal indicative of completion of the starting of the engine 100 to the H-ECU 30. The E-ECU 29 then terminates the execution of the present routine.

Due to the aforementioned engine starting control routine thus executed by the E-ECU 29, when the engine 100 is started with the second three-way catalyst 12b in its non-activated state, fuel injection control is prohibited for a period extending from the starting of the cranking of the engine 100 to the attainment or excess of the predetermined engine speed. Therefore the exhaust gas consisting only of air and containing an excess of oxygen is discharged from the engine 100 in the meantime. This exhaust gas is supplied to the second three-way catalyst 12b, so that a large amount of oxygen is stored in the second three-way catalyst 12b.

Figure 6:
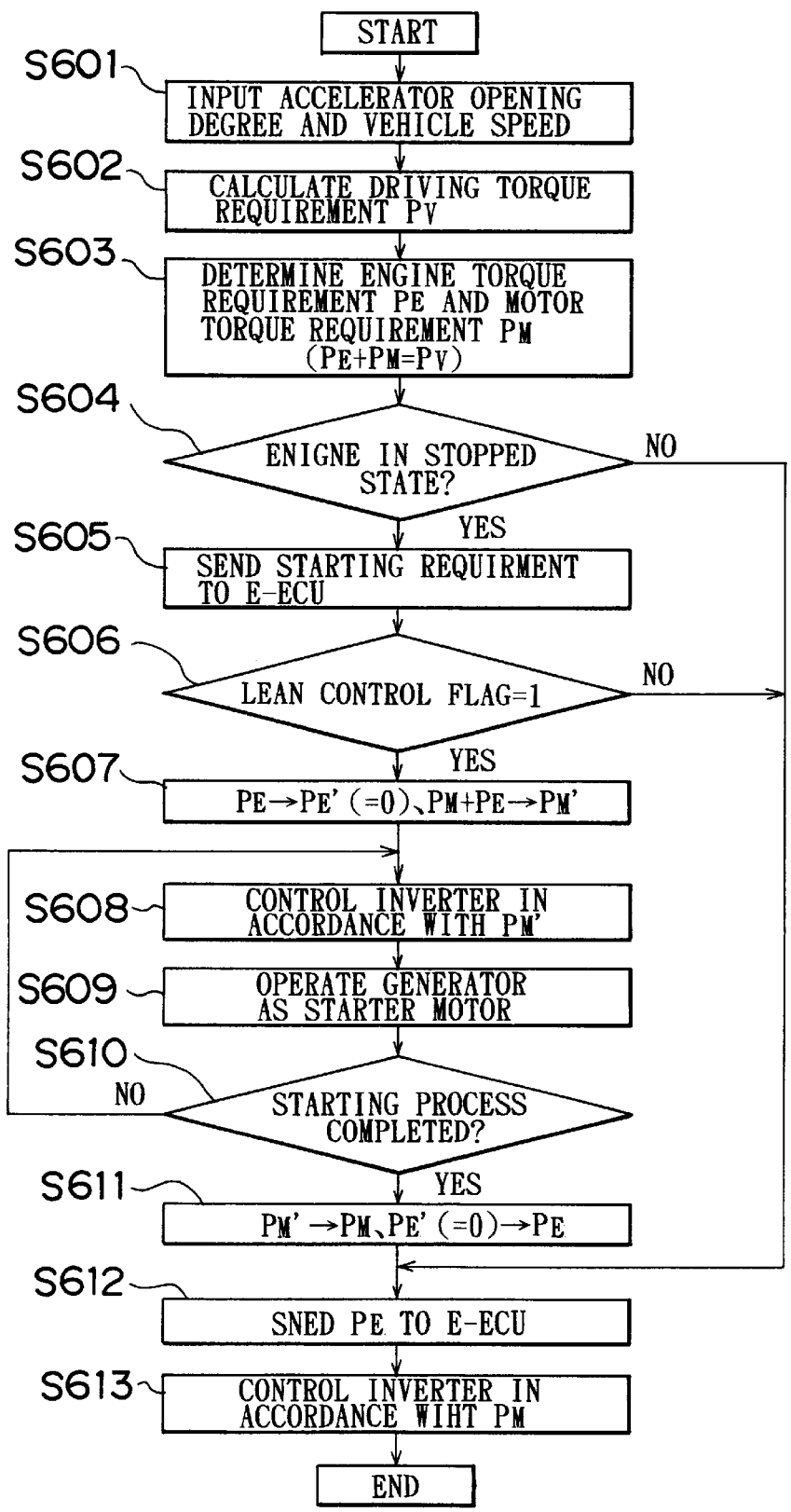
FIG. 6 is a flowchart showing a power control routine.

On the other hand, the H-ECU 30 executes a power control routine as shown in FIG. 6, which is repeatedly executed at intervals of a predetermined length of time when the ignition switch is on. This routine is preliminarily stored in the ROM or the like of the H-ECU 30.

In the power control routine, first of all in step S601, an output signal from the acceleration position sensor 31 (the accelerator opening degree) and an output signal from a vehicle speed sensor (not shown) are inputted to the H-ECU 30.

In step S602, the H-ECU 30 calculates a driving torque required by the driver (a driving torque requirement) Pv from the accelerator opening degree and vehicle speed inputted in step S601.

In step S603, the H-ECU 30 determines a torque to be outputted from the engine 100 (an engine torque requirement) $P_E$ and a torque to be outputted from the electric motor 200 (a motor torque requirement) $P_M$ for the purpose of meeting the driving torque requirement $P_V$ calculated in step S602.

The H-ECU 30 determines in step S604 whether or not the engine 100 is in its stopped state.

If it is determined in step S604 that the engine 100 is in its stopped state, the E-ECU 30 proceeds to step S605 and sends a requirement for the starting of the engine 100 to the E-ECU 29.

In step S606, the H-ECU 80 gets access to the lean control flag storage area and determines whether or not 1 is set therein.

If it is determined in step S606 that "1" is set in the lean control flag storage area, the H-ECU 30 proceeds to step S607 and judges that the engine 100 is not to be started immediately. Then the H-ECU 30 subtracts a value equal to $P_E$ from the engine torque requirement $P_E$ determined in step S603, thus calculating a novel engine torque requirement $P_E'(=0)$. Also, the H-ECU 30 adds the value equal to $P_E$ to the motor torque requirement $P_M$ determined in step S603, thus calculating a novel motor torque requirement $P_M'(=P_M+P_E)$.

In step S608, the H-ECU 30 controls the inverter 26 such that the actual torque outputted from the electric motor 200 becomes equal to the motor torque requirement $P_M'$ calculated in step S607.

In step S609, the H-ECU 30 controls the inverter 26 to operate the generator 20 as a starter motor for the engine 100.

In step S610, the H-ECU 30 determines whether or not the starting of the engine 100 has been completed, that is, whether or not it has received a notification of completion of the starting of the engine 100.

If it is determined in step S610 that the starting of the engine 100 has not been completed, the H-ECU 30 repeatedly performs the processings in step S608 and the following steps.

If it is determined in step S610 that the starting of the engine 100 has been completed, the H-ECU 30 proceeds to step S611 and resets the engine torque requirement PE☐ and motor torque requirement $P_M'$ calculated in step S607 to the engine torque requirement $P_E'$ and motor torque requirement $P_M$ calculated in step S603.

In step S612, the H-ECU 30 controls the E-ECU 29 such that the actual torque outputted from the engine 100 becomes equal to the engine torque requirement PE corrected in step S611.

In step S613, the H-ECU 30 controls the inverter 26 such that the actual torque outputted from the electric motor 200 becomes equal to the motor torque requirement $P_M$ corrected in step S611, and then terminates the execution of the present routine.

On the other hand, if it is determined in step S604 that the engine 100 is not in its stopped state (that the engine 100 is already in its operated state) or if it is determined in step S606 that "1" is not set in the lean control flag storage area (that "0" is stored in the lean control flag storage area), the H-ECU 30 proceeds to step S612 and controls the E-ECU 29 such that the actual torque outputted from the engine 100 becomes equal to the engine torque requirement PE calculated in step S603.

Next in step S613, the H-ECU 30 controls the inverter 26 such that the actual torque outputted from the electric motor 200 becomes equal to the motor torque requirement $P_M$ calculated in step S603, and then terminates the execution of the present routine.

In the case where the completion of the starting of the engine 100 is delayed for a predetermined period to supply the second three-way catalyst 12b with lean exhaust gas, the torque outputted from the electric motor 200 within the predetermined period is increased through such execution of the aforementioned power control routine by the H-ECU 30. Therefore, even if the completion of the starting of the engine 100 is delayed, the driving force of the vehicle does not decrease.

As described hitherto, the E-ECU 29 executes the engine starting control routine and the H-ECU 30 executes the power control routine, whereby power controller according to the present invention is realized.

Thus, according to this embodiment, in the case where it is necessary to cause the adsorbent 152 to adsorb the unburnt fuel components in exhaust gas when the second three-way catalyst 12b is in its non-activated state, to desorb the unburnt fuel components from the adsorbent 152 after the second three-way catalyst 12b has been activated, and to purify the unburnt fuel components by means of the second three-way catalyst 12b, for example in the case where the engine 100 has been cold-started, it is possible to store a sufficient amount of oxygen in the second three-way catalyst 12b prior to the desorption of the unburnt fuel components from the adsorbent 152 without reducing a driving force of the vehicle, and to reliably purify the unburnt fuel components desorbed from the adsorbent 152.

The description of this embodiment has been made with reference to an example wherein the exhaust gas consisting only of air and containing an excess of oxygen is supplied to the second three-way catalyst 12b by prohibiting fuel injection control from being performed for a period extending from the starting of the cranking of the engine 100 to the attainment or excess of the predetermined engine speed. However, the exhaust gas consisting only of air and containing an excess of oxygen may be supplied to the second three-way catalyst 12b by counting the number of times for carrying out fuel injection since the starting of the cranking of the engine 100 and prohibiting actual fuel injection until the counted number reaches or exceeds a predetermined value.

Alternatively, the exhaust gas consisting only of air and containing an excess of oxygen may be supplied to the second three-way catalyst 12b by measuring an elapsed time since the starting of the cranking of the engine 100 and prohibiting fuel injection control until the elapsed time reaches or exceeds a predetermined length of time.

After all, this embodiment can employ any construction as long as it can supply the exhaust gas consisting only of air and containing an excess of oxygen to the second threeway catalyst 12b by prohibiting fuel injection control from being performed for a predetermined period since the starting of the cranking of the engine 100.

An exhaust gas purifier according to a second embodiment of the present invention will be described with reference to the drawings. The following description will be made as to the construction different from that of the first embodiment. The same construction as in the first embodiment will not be mentioned.

Figure 7:
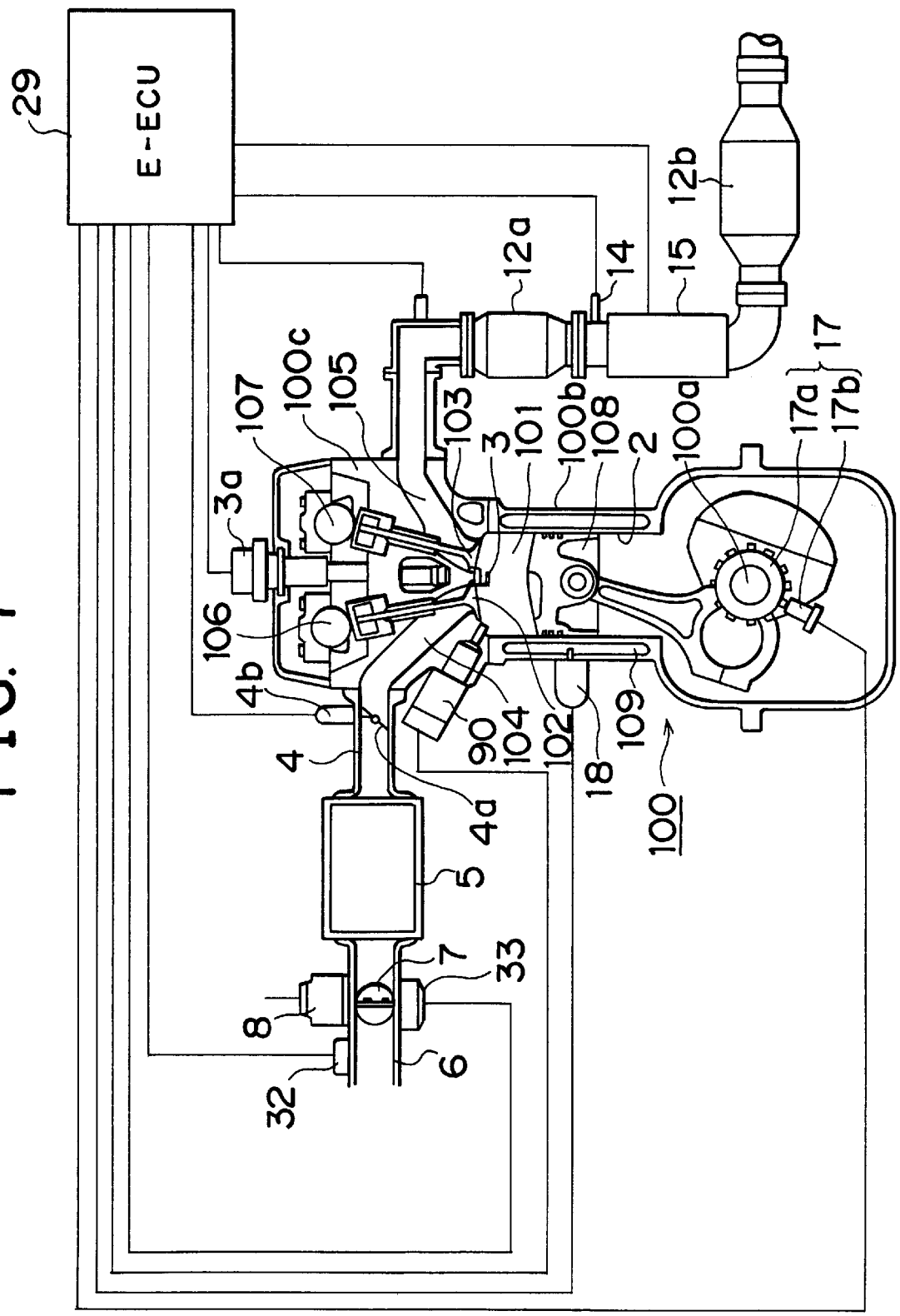
FIG. 7 shows the overall structure of an internal combustion engine according to a second embodiment of the present invention.

FIG. 7 shows the overall structure of an engine 100 of the second embodiment. The engine 100 shown in FIG. 7 is a direct injection type gasoline engine that is provided with fuel injection valves 90 for directly injecting fuel into respective cylinders 2.

More specifically, the engine 100 is provided with a cylinder block 100b in which a plurality of cylinders 2 and a water jacket 109 is formed and with a cylinder head 100c fixed to the upper portion of the cylinder block 100b.

The cylinder block 100b rotatably supports a crank shaft 100a which is an engine output shaft. The crank shaft 100a is coupled to pistons 108 slidably fitted in respective cylinders 2.

The end portion of the crank shaft 100a is fitted with a timing rotor 17a, and the cylinder block 100b is fitted in the vicinity of the timing rotor 17a with an electromagnetic pick-up 17b. The timing rotor 17a and the electromagnetic pick-up 17b constitute a crank position sensor 17.

Formed above each of the pistons 108 is a combustion chamber 101 which is surrounded by the piston 108 and the cylinder head 100c.

The cylinder head 100c is fitted with an ignition plug 3 such that the ignition plug 3 faces the combustion chamber 101. An igniter 3a for applying driving current to the ignition plug 3 is connected thereto.

For each of the cylinders 2, two intake ports 104 and two exhaust ports 105 are formed in the cylinder head 100c such that the open ends thereof face the combustion chamber 101.

The cylinder head 100c is fitted with a fuel injection valve 90 such that the injection hole thereof faces the combustion chamber 101.

The cylinder head 100c reciprocally supports an intake valve 102 for opening and closing the open end of the intake port 104 of the combustion chamber 101 and an exhaust valve 103 for opening and closing the open end of the exhaust port 105 of the combustion chamber 101.

The cylinder head 100c rotatably supports an intake-side cam shaft 106 for reciprocally driving respective intake valves 102 and an exhaust-side cam shaft 107 for reciprocally driving respective exhaust valves 103.

The intake-side cam shaft 106 and the exhaust-side cam shaft 107 are coupled to the crank shaft 100a through a timing belt (not shown). The rotational force of the crank shaft 100a is transmitted to the intake-side cam shaft 106 and the exhaust-side cam shaft 107 through the timing belt.

One of the two intake ports 104 is formed of a straight port having a rectilinear flow passage extending from an open end formed in the outer wall of the cylinder head 100c towards the open end facing the combustion chamber 101. The other intake port 104 is formed of a helical port having a spiral flow passage extending from an open end formed in the outer wall of the cylinder head 100c towards the open end facing the combustion chamber 101.

While each of the intake ports 104 communicates with a corresponding one of the branches of an intake branch pipe 4 connected to the cylinder head 100c, each of the exhaust ports 105 communicates with a corresponding one of the branches of an exhaust branch pipe 10 connected to the cylinder head 100c.

The branch of the intake branch pipe 4 that communicates with the straight port of the engine 100 is provided with a swirl control valve 4a which opens and closes an intake flow passage in the branch.

The swirl control valve 4a is fitted with an actuator 4b which is composed of a step motor or the like and on-off drives the swirl control valve 4a in accordance with an electric current applied. The actuator 4b is connected to the E-ECU 29 through an electric wire.

Figure 8:
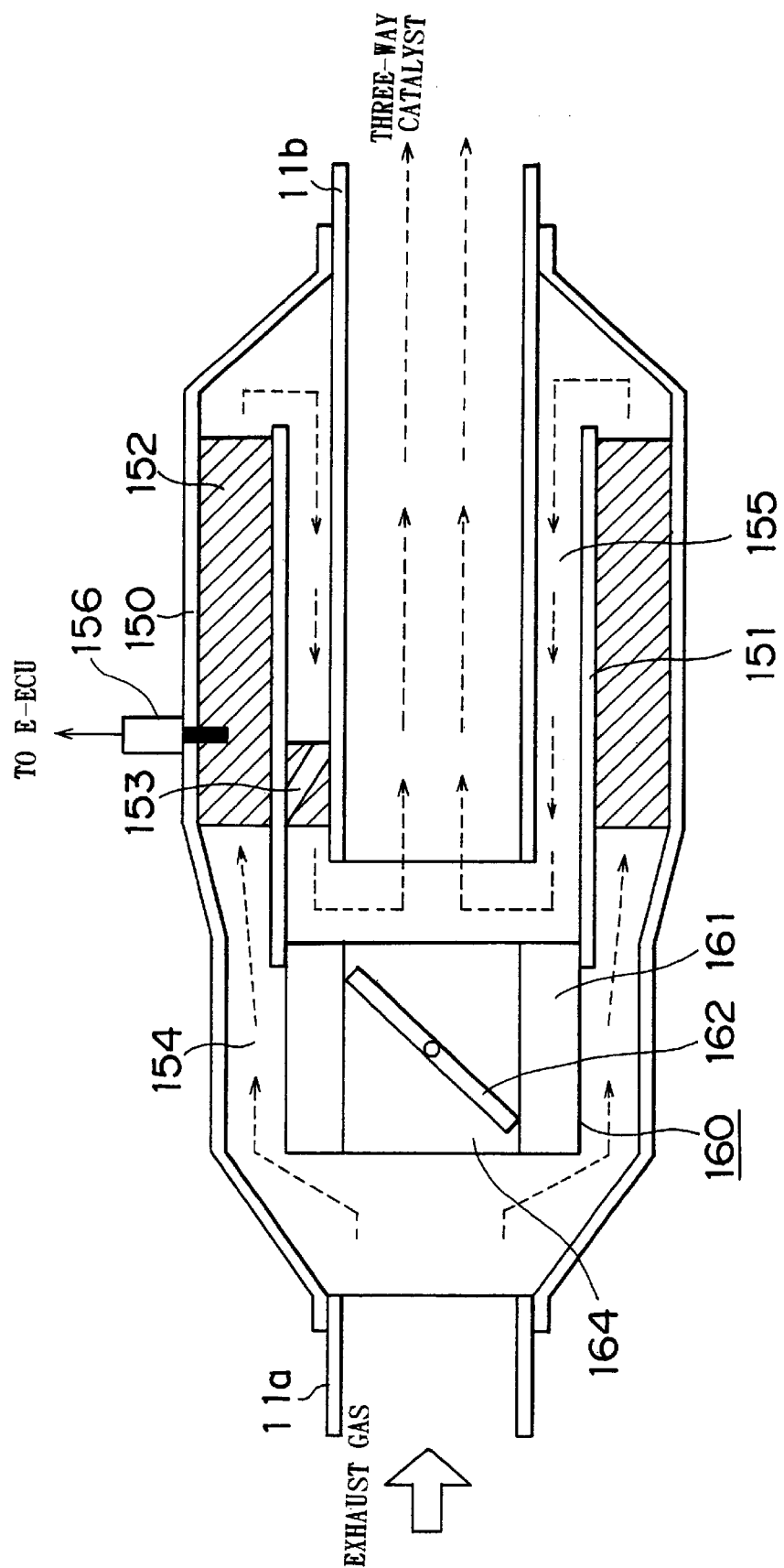
FIG. 8 shows the structure of an adsorption mechanism according to the second embodiment of the present invention.

As shown in FIG. 8, the adsorption mechanism 15 in this embodiment is fitted with an adsorbent temperature sensor 156 which outputs an electric signal corresponding to a temperature of the adsorbent 152. The adsorbent temperature sensor 156 is one specific example of the adsorbent temperature detecting device according to the present invention.

The adsorbent temperature sensor 156 is connected to the E-ECU 29 through an electric wire, and the output signal from the adsorbent temperature sensor 156 is inputted to the E-ECU 29.

In this case, the E-ECU 29 performs the following control based on the output signals from various sensors and the signal from the H-ECU 30.

First of all, if the engine torque required by the H-ECU 30 is small and the engine 100 is in its low-load operational range, the E-ECU 29 reduces an opening degree of the swirl control valve 4a by controlling the actuator 4b and performs compression-stroke injection by applying a driving current to the fuel injection valve 90 during a compression stroke of each cylinder 2, with a view to realizing stratified combustion.

In this case, in the combustion chamber 101 of each cylinder 2, there is formed a combustible mixture layer only in the vicinity of the ignition plug 3, whereas there is formed an air layer in the other area. Thereby stratified combustion is realized.

If the engine torque required by the H-ECU 30 is great to some extent and the engine 100 is in its intermediate-load operational range, the E-ECU 29 reduces an opening degree of the swirl control valve 4a by controlling the actuator 4b and performs intake-stroke injection by applying a driving current to the fuel injection valve 90 during an intake stroke of each cylinder 2, with a view to realizing homogeneous combustion by means of lean mixture.

In this case, there is formed a lean mixture homogeneously containing air and fuel substantially over the entire area in the combustion chamber 101 of each cylinder 2. Thereby homogeneous combustion is realized.

If the engine torque required by the H-ECU 30 is great and the engine 100 is in its high-load operational range, the E-ECU 29 completely opens the swirl control valve 4a by controlling the actuator 4b and performs intake-stroke injection by applying a driving current to the fuel injection valve 90 during an intake stroke of each cylinder 2, with a view to realizing homogeneous combustion by means of the mixture having an air-fuel ratio close to the stoichiometric air-fuel ratio.

In this case, there is formed a stoichiometric mixture homogeneously containing air and fuel substantially over the entire area in the combustion chamber 101 of each cylinder 2. Thereby homogeneous combustion is realized.

In order to prevent torque fluctuations of the engine 100 at the time of a transition from stratified combustion to homogeneous combustion or vice versa, the E-ECU 29 may apply driving current to the fuel injection valve 90 twice, namely, during a compression stroke and an intake stroke of each cylinder 2.

In this case, in the combustion chamber 101 of each cylinder 2, there is formed a combustible mixture layer in the vicinity of the ignition plug 3, whereas there is formed a lean mixture layer in the other area. Thereby so-called weakly stratified combustion is realized.

In the engine 100 having such a construction, if the amount of intake air in the engine 100 increases when unburnt fuel components are desorbed from the adsorbent 152 of the adsorption mechanism 15, the flow amount of exhaust gas in the engine 100 increases accordingly. Therefore it is considered that the unburnt fuel components that have been adsorbed to the adsorbent 152 be desorbed at a time.

In this case, if the engine 100 is in its homogeneous combustion operational state, the exhaust gas discharged from the engine 100 does not contain an excessive amount of oxygen. Hence, if a large amount of unburnt fuel components desorbed from the adsorbent 152 at a time mix with the exhaust gas, there arises a concern that the second three-way catalyst 12b might undergo a deficiency in oxygen.

Thus, according to this embodiment, if the engine 100 is in its homogeneous combustion operational state and the amount of intake air thereof is equal to or greater than a predetermined amount when the unburnt fuel components adsorbed to the adsorbent 152 of the adsorption mechanism 15 are desorbed from the adsorbent 152, the E-ECU 29 forcibly switches the operated state of the engine 100 from homogeneous combustion operation to stratified combustion operation, thus attempting to discharge the exhaust gas with an excess of oxygen from the engine 100.

On the other hand, if the operational state of the engine 100 is forcibly switched from homogeneous combustion operation to stratified combustion operation when the unburnt fuel components adsorbed to the adsorbent 152 of the adsorption mechanism 15 are desorbed from the adsorbent 152, the torque that can be outputted from the engine 100 decreases and there arises a concern that the driving force of the vehicle might decrease.

On the other hand, according to the present embodiment, if the operational state of the engine 100 is switched from homogeneous combustion operation to stratified combustion operation when the unburnt fuel components adsorbed to the adsorbent 152 of the adsorption mechanism 15 are desorbed from the adsorbent, the torque outputted from the electric motor 200 is increased to compensate for a decrease in torque of the engine 100.

Hereinafter, the control performed by the E-ECU 29 and the H-ECU 30 when the unburnt fuel components adsorbed to the adsorbent 152 of the adsorption mechanism 15 will be described specifically.

Figure 9:
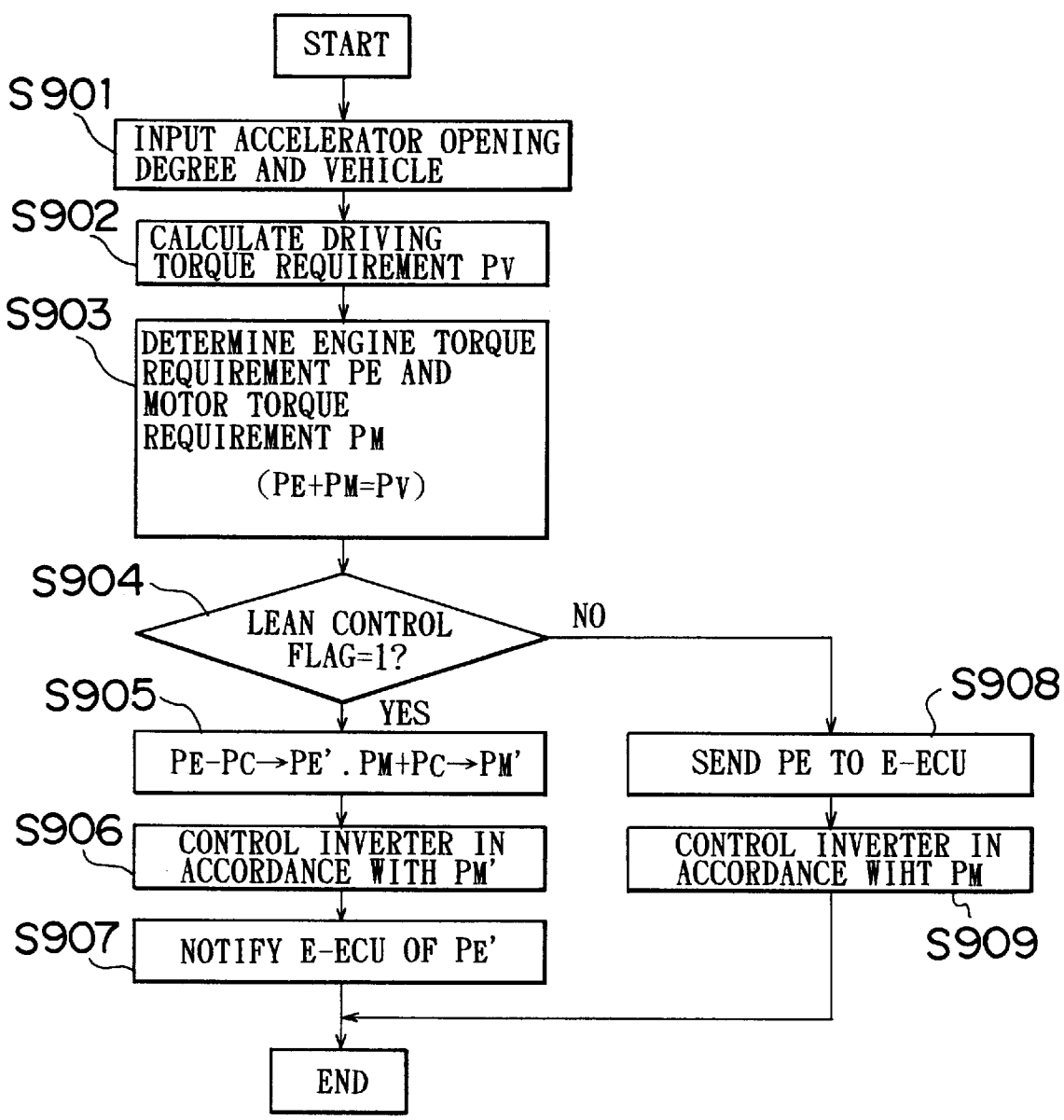
FIG. 9 is a flowchart showing a power control routine according to the second embodiment of the present invention.

First of all, the H-ECU 30 controls powers outputted from the engine 100 and the electric motor 200 when the unburnt fuel components are desorbed from the adsorbent 152, according to a power control routine as shown in FIG. 9.

The power control routine is repeatedly executed at intervals of a predetermined length of time when an ignition switch (not shown) is on. This routine is preliminarily stored in the ROM or the like of the H-ECU 30.

In the power control routine, first of all in step S901, the output signal from the accelerator position sensor 31 (the accelerator opening degree) and the output signal from the vehicle speed sensor are inputted to the H-ECU 30.

In step S902, the H-ECU 30 calculates a driving torque required by the driver (a driving torque requirement) $P_V$ from the accelerator opening degree and vehicle speed inputted in step S901.

In step S903, the H-ECU 30 determines a torque to be outputted from the engine 100 (an engine torque requirement) PE and a torque to be outputted from the electric motor 200 (a motor torque requirement) $P_M$ for the purpose of meeting the driving torque requirement $P_V$ calculated in step S902.

In step S904, the H-ECU 30 gets access to a lean control flag storage area set in a memory commonly shared by the E-ECU 29 and the H-ECU 30 and determines whether or not "1" is set therein.

In the case where the unburnt fuel components are desorbed from the adsorbent 152 and where the operational state of the engine 100 is forcibly switched from homogeneous combustion operation to stratified combustion operation, "1" is set in the lean control flag storage area. This area is reset from "1" to "0" when the desorption of the unburnt fuel components adsorbed to the adsorbent 152 is completed. The value set in this lean control flag storage area is rewritten by the E-ECU 29.

Referring back to FIG. 9, if it is determined in step S904 that "1" is not set in the lean control flag storage area, that is, if it is determined that "0" is stored in the lean control flag storage area, the H-ECU 30 judges that the engine 100 and the electric motor 200 can be controlled normally, and proceeds to step S908.

In step S908, the H-ECU 30 controls the E-ECU 29 such that the actual torque outputted from the engine 100 becomes equal to the engine torque requirement $P_E$ calculated in step S903.

Next in step S909, the H-ECU 30 controls the inverter 26 such that the actual torque outputted from the electric motor 200 becomes equal to the motor torque requirement calculated in step S903, and terminates the execution of the present routine.

On the other hand, if it is determined in step S904 that "1" is set in the lean control flag storage area, the H-ECU 30 judges that the operational state of the engine 100 is forcibly switched from homogeneous combustion to stratified combustion and that the torque outputted from the engine 100 decreases, and proceeds to step S905.

In step S905, the H-ECU 30 subtracts a predetermined value $P_C$ from the engine torque requirement PE calculated in step S903 and calculates a novel engine torque requirement $P_E'(=P_E-P_C)$ to make the engine torque requirement lower than its usual level, and adds the predetermined value $P_C$ to the motor torque requirement $P_M$ determined in step S903 and calculates a novel motor torque requirement $P_M'(=P_M+P_C)$ to make the motor torque requirement higher than its usual level.

In step S906, the H-ECU 30 controls the inverter 26 such that the actual torque outputted from the electric motor 200 becomes equal to the motor torque requirement $P_M'$ corrected in step S905.

In step S907, the H-ECU 30 controls the E-ECU 29 such that the actual torque outputted from the engine 100 becomes equal to the engine torque requirement $P_E'$ corrected in step S905.

After having performed the processing of step S907, the H-ECU 30 temporarily terminates the execution of the present routine and executes it again after the lapse of a predetermined length of time.

In this case, if it is determined in step S904 that the value of the lean control flag storage area has been reset from "1" to "0", the E-ECU 30 performs control in steps S908 and S909 to put the torque outputted from the engine 100 and the torque outputted from the electric motor 200 back to their usual levels.

Figure 10:
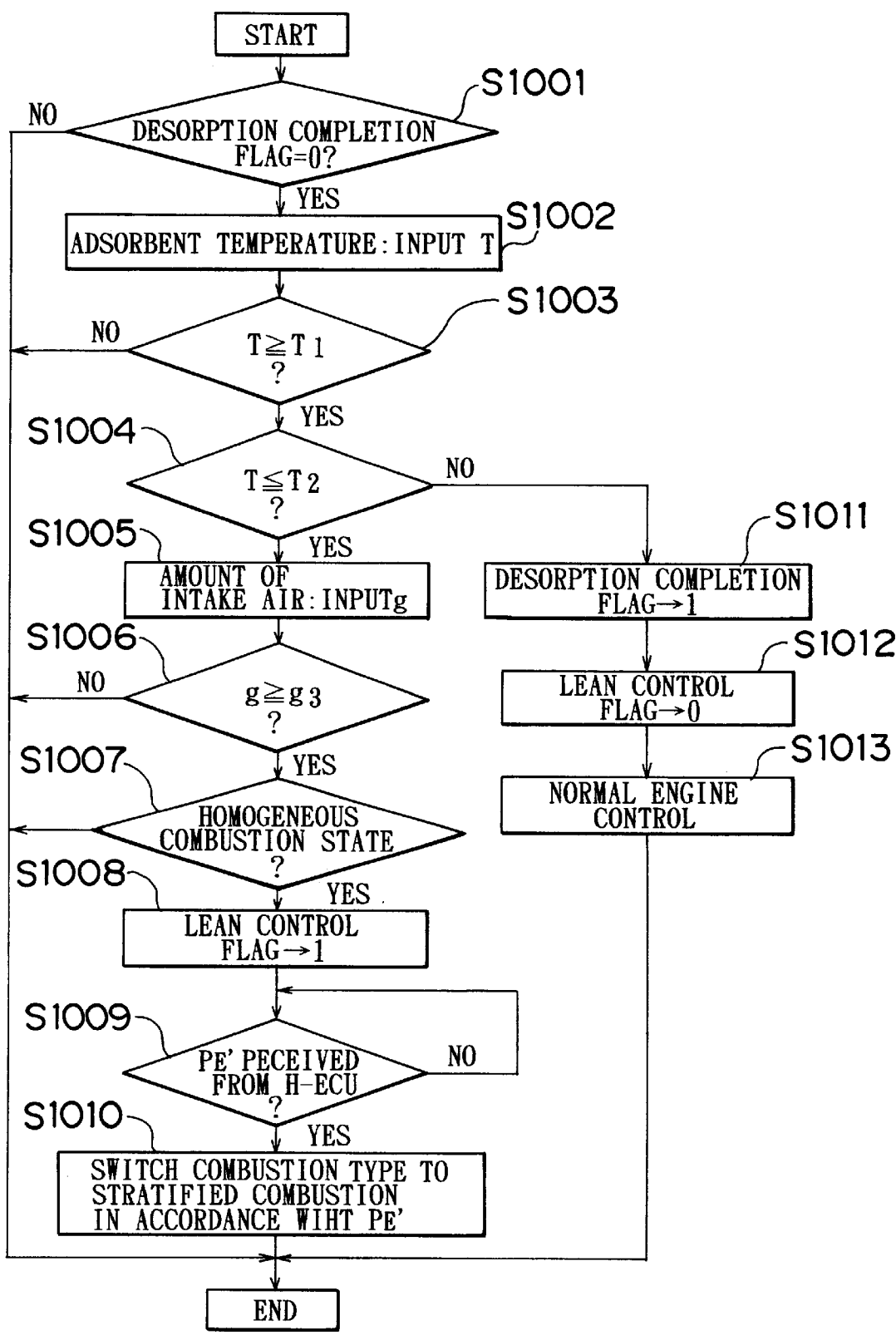
FIG. 10 is a flowchart showing an engine exhaust control routine according to the second embodiment of the present invention.

Next, the E-ECU 29 controls the exhaust gas that is discharged from the engine 100 when the unburnt fuel components are desorbed from the adsorbent 152, according to an engine exhaust control routine as shown in FIG. 10.

The engine exhaust control routine is repeatedly executed at intervals of a predetermined length of time when the ignition switch is on. This routine is preliminarily stored in the ROM or the like of the E-ECU 29.

In the engine exhaust control routine, first of all in step S1001, the E-ECU 29 determines whether or not "0" is stored in a desorption completion flag storage area which is set in the RAM or the like of the E-ECU 29.

If the unburnt fuel components adsorbed to the adsorbent 152 have not been desorbed completely, "0" is written into the desorption completion flag storage area. If the unburnt fuel components adsorbed to the adsorbent 152 have been desorbed completely, "1" is written into the desorption completion flag storage area.

For example, as a method of determining whether or not the unburnt fuel components adsorbed to the adsorbent 152 have been desorbed completely, the temperature range where the unburnt fuel components adsorbed to the adsorbent 152 are desorbed is preliminarily found out through experiments, and it is determined whether or not the output signal value of the adsorbent temperature sensor 156 has exceeded the upper limit value of the temperature range (the upper and lower limit values of the temperature range where the unburnt fuel components are desorbed will be denoted hereinafter by $T_1$ and $T_2$ respectively).

Referring back to FIG. 10, if it is determined in step S1001 that "0" is not stored in the desorption completion storage area, namely, that "1" is stored in the desorption completion flag storage area, the E-ECU 29 terminates the execution of the present routine.

If it is determined in step S1001 that "0" is stored in the desorption completion flag storage area, the E-ECU 29 proceeds to step S1002 where the output signal value T of the adsorbent temperature sensor 156 is inputted to the E-ECU 29.

In step S1003, the E-ECU 29 reads from the ROM the lower limit value $T_1$ of the temperature range where the unburnt fuel components are desorbed, and determines whether or not the output signal value T of the adsorbent temperature sensor 156 inputted in step S1002 is equal to or greater than the lower limit value $T_1$.

If it is determined in step S1003 that the output signal value T of the adsorbent temperature sensor 156 is smaller than the lower limit value $T_1$, the E-ECU 29 judges that the temperature of the adsorbent 152 has not risen to a temperature where the unburnt fuel components start being desorbed, namely, that the adsorbent 152 has the unburnt fuel components adsorbed thereto, and temporarily terminates the execution of the present routine.

If it is determined in step S1003 that the output signal value T of the adsorbent temperature sensor 156 is equal to or greater than the limit value $T_1$, the E-ECU 29 proceeds to step S1004 and reads from the ROM the upper limit value $T_2$ of the temperature range where the unburnt fuel components are desorbed. The E-ECU 29 then determines whether or not the output signal value T of the adsorbent temperature sensor 156 inputted in step S1002 is equal to or smaller than the upper limit value $T_2$.

If it is determined in step S1004 that the output signal value T of the adsorbent temperature sensor 156 is equal to or smaller than the upper limit value $T_2$, the E-ECU 29 judges that the unburnt fuel components are being desorbed from the adsorbent 152, and proceeds to step S1005.

In step S1005, the output signal value of the airflow meter 32 (the amount of intake air: g) is inputted to the E-ECU 29.

The E-ECU 29 determines in step S1006 whether or not the output signal value g of the airflow meter 32 inputted in step S1005 is equal to or greater than a predetermined amount $g_s$ of intake air.

If it is determined in step S1006 that the output signal value g of the airflow meter 32 is smaller than the predetermined amount $g_s$ of intake air, the E-ECU 29 judges that the unburnt fuel components adsorbed to the adsorbent 152 are not desorbed abruptly and that the second three-way catalyst 12b does not undergo a deficiency in oxygen, and then terminates the execution of the present routine.

On the other hand, if it is determined in step S1006 that the output signal value g of the airflow meter 32 is equal to or greater than the predetermined amount $g_s$ of intake air, the E-ECU 29 proceeds to step S1007 and determines whether or not the engine 100 is in its homogeneous combustion operational state.

If it is determined in step S1007 that the engine 100 is in its homogeneous combustion operational state, the E-ECU 29 judges that there is a concern that the second three-way catalyst 12b might undergo a deficiency in oxygen, because a large amount of the exhaust gas that does not contain an excessive amount of oxygen is discharged from the engine 100 and the unburnt fuel components adsorbed to the adsorbent 152 are desorbed abruptly.

In this case, the E-ECU 29 judges that the operational state of the engine 100 needs to be switched forcibly from homogeneous combustion operation to stratified combustion operation to discharge the exhaust gas with an excess of oxygen from the engine 100, and writes "1" into the lean control flag storage area in step S1008.

After having performed the processing of step S1008, the E-ECU 29 proceeds to step S1009 and determines whether or not it has received an engine torque requirement $P_E$ from the H-ECU 30. The engine torque requirement $P_E'$ represents a torque that can be outputted from the engine 100 in its stratified combustion operational state. As mentioned in the description of the power control routine, the engine torque requirement $P_E'$ is set smaller than the normal engine torque requirement $P_E$.

If it is determined in step S1009 that the engine torque requirement $P_E'$ has not been received from the H-ECU 30, the E-ECU 29 repeatedly performs the processing of step S1009 until it receives the engine torque requirement $P_E'$ from the H-ECU 30.

If it is determined in step S1009 that the engine torque requirement $P_E'$ has been received from the H-ECU 30, the E-ECU 29 forcibly switches the operational state of the engine 100 from homogeneous combustion operation to stratified combustion operation, and controls an opening degree of the swirl control valve 4a, a fuel injection amount, a fuel injection timing, an ignition timing and the like such that the actual torque outputted from the engine 100 coincides with the engine torque requirement $P_E'$.

After having performed the processing of step S1010, the E-ECU 29 temporarily terminates the execution of the present routine and executes it again after the lapse of a predetermined length of time. In this case, the E-ECU 29 judges in step S1001 that "0" is stored in the desorption completion flag storage area, and the output signal value T of the adsorbent temperature sensor 156 is inputted to the E-ECU 29 in step S1002. Next in step S1003, the E-ECU 29 determines that the output signal value T of the adsorbent temperature sensor 156 is equal to or greater than the lower limit value $T_1$ of the temperature range where the unburnt fuel components are desorbed, and then proceeds to step S1004.

If the output signal value T of the adsorbent temperature sensor 156 is greater than the upper limit value $T_2$ of the temperature range where the unburnt fuel components are desorbed in step S1004, the E-ECU 29 judges that the unburnt fuel components adsorbed to the adsorbent 152 have been desorbed completely, and rewrites the value set in the desorption completion flag storage area from "0" to "1" in step S1011.

The E-ECU 29 then proceeds to step S1012 and resets the value "1" set in the lean control flag storage area to "0".

In this case, as mentioned in the description of the power control routine, the H-ECU 30 puts the engine torque requirement for the engine 100 back to its usual level. Therefore, in step S1013, the E-ECU 29 controls the operational state of the engine 100 to meet the usual engine torque requirement.

As described hitherto, according to the present embodiment, in the case where the unburnt fuel components adsorbed to the adsorbent 152 are desorbed at a time, the operational state of the engine 100 is switched to stratified combustion operation so that the exhaust gas with an excess of oxygen is discharged from the engine 100. Therefore, even if a large amount of unburnt fuel components have flown into the second three-way catalyst 12b, there is no possibility of a deficiency in oxygen. As a result, the unburnt fuel components can be purified reliably.

Furthermore, according to the present embodiment, if the operational state of the engine 100 has forcibly been switched from homogeneous combustion operation to stratified combustion operation to discharge the exhaust gas with an excess of oxygen from the engine 100, the torque outputted from the electric motor 200 is increased. Therefore, even if the torque outputted from the engine 100 has decreased, the driving force of the vehicle does not decrease.

As a result, the E-ECU 29 executes the engine exhaust control routine and the H-ECU 30 executes the power control routine, whereby the power controller according to the present invention is realized.

Thus the present embodiment makes it possible to supply the second three-way catalyst 12b with oxygen without adversely affecting the driveability of the vehicle, when the unburnt fuel components are desorbed from the adsorbent 152.

In the exhaust gas purifier for hybrid vehicles according to the present invention, in the case where the internal combustion engine is operated at a lean air-fuel ratio to supply the exhaust gas purification catalyst with the exhaust gas with an excess of oxygen, the power from the auxiliary power source compensates for a decrease in power of the internal combustion engine. Hence, it becomes possible to supply the exhaust gas purification catalyst with the exhaust gas containing an excessive amount of oxygen without reducing a driving force of the vehicle.

In particular, in the case where the adsorbent, which adsorbs unburnt fuel components in exhaust gas when it is at a temperature lower than a predetermined temperature range and ejects the unburnt fuel components adsorbed thereto when it is heated up to reach the predetermined temperature range, is disposed in the exhaust passage upstream of the exhaust gas purification catalyst, the exhaust gas purification catalyst can store a sufficient amount of oxygen without reducing a driving force of the vehicle prior to the starting of the desorption of the unburnt fuel components from the adsorbent. Even if the unburnt fuel components desorbed from the adsorbent have flown into the exhaust gas purification catalyst, there is no possibility of a deficiency in oxygen caused therein.

According to the exhaust gas purifier for hybrid vehicles of the present invention, when the value detected by the adsorbent temperature detecting device is within a predetermined temperature range, namely, a temperature range where the unburnt fuel components adsorbed to the adsorbent are desorbed therefrom, the internal combustion engine is operated at a lean air-fuel ratio to supply the exhaust gas purification catalyst with the exhaust gas containing an excessive amount of oxygen, and the auxiliary power source is controlled to increase the torque outputted therefrom. Therefore, the exhaust gas with an excess of oxygen can be discharged from the internal combustion engine without reducing a driving force of the vehicle.

As a result, it is possible to supply the exhaust gas purification catalyst with the exhaust gas containing an excessive amount of oxygen without adversely affecting the driveability of the vehicle. Even if the unburnt fuel components desorbed from the adsorbent have flown into the exhaust gas purification catalyst, there is no possibility of a deficiency in oxygen caused therein. Thus the unburnt fuel components can reliably be purified.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the present invention.

What is claimed is:

1. An exhaust gas purifier for a hybrid vehicle driven by power from an internal combustion engine and power from an auxiliary power source, the exhaust gas purifier comprising:

an exhaust gas purification catalyst disposed in an exhaust passage of the engine, wherein, when exhaust gas flowing into the catalyst contains an excess amount of oxygen, the catalyst stores therein oxygen contained in the exhaust gas and, when exhaust gas flowing into the catalyst has a low oxygen concentration, the catalyst ejects the stored oxygen therefrom;

a power controller coupled to the engine and the auxiliary power source which determines whether oxygen needs to be stored in the catalyst, wherein, when oxygen is to be stored in the catalyst, the power controller causes the engine to discharge exhaust gas with an excess amount of oxygen and controls the auxiliary power source to assist the engine in driving the vehicle with a greater assist torque than an assist torque required when oxygen does not need to be stored in the catalyst.

2. The exhaust gas purifier according to claim 1, further comprising:

an adsorbent disposed in the exhaust passage upstream of the catalyst wherein, when a temperature of the adsorbent is lower than a predetermined temperature, the adsorbent adsorbs unburnt fuel components in the exhaust gas and, when the adsorbent temperature is at least the predetermined temperature, the adsorbent ejects the adsorbed unburnt fuel components; and an adsorbent temperature detector that detects a temperature of the adsorbent, wherein, when the detected adsorbent temperature is lower than the predetermined temperature, the power controller causes the engine to discharge exhaust gas including excess oxygen by reducing an amount of fuel injected to the engine and increases a power outputted from the auxiliary power source.

3. The exhaust gas purifier according to claim 1, wherein, for a predetermined period of time after a start of cranking of the engine when it is being started, the power controller prohibits fuel injection from being carried out and operates the auxiliary power source to drive the vehicle.

4. The exhaust gas purifier according to claim 3, wherein the predetermined period of time extends from a start of the cranking of the engine to a time at which an engine speed is at least a predetermined engine speed.

5. The exhaust gas purifier according to claim 3, wherein the predetermined period of time extends from a start of cranking of the engine to a time at which a number of times that the fuel injection is prohibited becomes at least a predetermined number.

6. The exhaust gas purifier according to claim 1, wherein the power controller determines whether oxygen needs to be stored in the catalyst when exhaust gas purification is not active.

7. An exhaust gas purifier for a hybrid vehicle driven by power from an internal combustion engine and power from an auxiliary power source, the vehicle including a main exhaust passage, the exhaust gas purifier comprising;

a bypass passage that bypasses the main exhaust passage;

an exhaust gas purification catalyst disposed in the main exhaust passage wherein, when exhaust gas flowing into the catalyst includes an excess amount of oxygen, the catalyst stores oxygen therein and, when the exhaust gas flowing into the catalyst has a low oxygen concentration, the catalyst ejects the stored oxygen therefrom;

an adsorbent disposed in the bypass passage wherein, when a temperature of the adsorbent is lower than a predetermined temperature, the adsorbent adsorbs therein unburnt fuel components included in the exhaust gas and, when the adsorbent temperature is at least the predetermined temperature, the adsorbent eject therefrom the adsorbed unburnt fuel components;

a flow passage switch that switches a flow of the exhaust gas so that, when the catalyst is in a non-activated state, all exhaust gas flows through the bypass passage and, after activation of the catalyst, directs most of the exhaust gas through the main exhaust passage with a negligible amount of exhaust gas flowing through the bypass passage; and a power controller coupled to the engine and to the auxiliary power source wherein, when oxygen is to be stored in the catalyst, the power controller causes the engine to discharge exhaust gas including an excess amount of oxygen and causes the auxiliary power source to assist the engine in driving the vehicle.

8. The exhaust gas purifier according to claim 7, wherein, for a predetermined period of time after a start of cranking of the engine when it is being started, the power controller prohibits a fuel injection to the engine and causes the auxiliary power source to drive the vehicle.

9. The exhaust gas purifier according to claim 8, wherein the predetermined period of time extends from the start of the cranking of the engine until an engine speed is at least a predetermined engine speed.

10. The exhaust gas purifier according to claim 8, wherein the predetermined period of time extends from the start of the cranking of the engine until a number of times that the fuel injection operation is prohibited becomes at least a predetermined number.

11. The exhaust gas purifier according to claim 7, further comprising an adsorbent temperature detector detecting the adsorbent temperature, wherein, when the adsorbent temperature is lower than the predetermined temperature range, the power controller reduces a fuel injection amount so that the engine produces exhaust gas including an excess amount of oxygen and increases a power outputted from the auxiliary power source.

12. The exhaust gas purifier according to claim 7, further comprising an catalyst temperature detector detecting a temperature of the catalyst, wherein the flow passage switch switches the flow of exhaust gas based on the catalyst temperature.

13. The exhaust gas purifier according to claim 7, further comprising a coolant temperature detector that detects a temperature of engine coolant, wherein the flow passage switch switches the flow of exhaust gas based on the coolant temperature.

14. An exhaust gas purifier for a hybrid vehicle driven by power from an internal combustion engine and power from an auxiliary power source, the engine including a main exhaust passage, the exhaust gas purifier comprising;

a bypass passage for bypassing the main exhaust passage;

an exhaust gas purification catalyst disposed in the main exhaust passage wherein, when exhaust gas flowing into the catalyst includes excess oxygen, the catalyst stores oxygen therein and, when the exhaust gas has a low oxygen concentration, the catalyst ejects the stored oxygen;

an adsorbent disposed in the bypass passage wherein, when a adsorbent temperature is lower than a predetermined temperature, the adsorbent adsorbs unburnt fuel components included in the exhaust gas and, when the adsorbent temperature is at least the predetermined temperature, the adsorbent ejects therefrom the adsorbed unburnt fuel components;

a flow passage switch that switches a flow of exhaust gas so that, when the exhaust gas purification catalyst is in a non-activated state, all of the exhaust gas flows through the bypass passage and, after activation of the exhaust gas purifier, the flow passage switch directs the exhaust gas flow through the main exhaust passage with a negligible amount of exhaust gas flowing through the bypass passage;

an adsorbent temperature detector detecting the adsorbent temperature; and a power controller coupled to the engine and the auxiliary power source wherein, when the adsorbent temperature is at least th e predetermined temperature, the power controller causes the engine to discharge exhaust gas with an excess of oxygen and causes the auxiliary power source to assist the engine in driving the vehicle.

15. The exhaust gas purifier according to claim 14, further comprising:

a power requirement detector that detects, when the adsorbent temperature is at least the predetermined temperature, a power required to drive the vehicle; and an actual power detector that detects actual powers outputted from the engine and the auxiliary power source, wherein the power contoller increases a power outputted from the auxiliary power source when the detected power requirement exceeds the actual power outputted from the engine and the auxiliary power source.

16. A method of purifying exhaust gas for a hybrid vehicle driven by power from an internal combustion engine and power from an auxiliary power source, the method comprising the steps of:

determining whether oxygen needs to be stored in an exhaust gas purification catalyst disposed in an exhaust passage of the engine;

storing oxygen in the catalyst by discharging from the engine exhaust gas including excess oxygen; and causing the auxiliary power source to assist the engine in driving the vehicle with a greater assist torque than an assist torque required when oxygen does not need to be stored in the catalyst.

17. The method according to claim 16, further comprising the steps of:

detecting a temperature of an adsorbent disposed in the exhaust passage upstream of the catalyst;

reducing an amount of fuel injected to the engine adsorbent when the detected temperature is lower than a predetermined temperature range so that the engine discharges exhaust gas including excess oxygen and unburnt fuel components contained in the exhaust gas are adsorbed into the absorbent; and increasing power outputted from the auxiliary power source.

18. The method according to claim 16, further comprising the step of:

determining whether oxygen needs to be stored in the catalyst when exhaust gas purification is not active.

19. A method of purifying exhaust gas for a hybrid vehicle driven by power from an internal combustion engine and power from an auxiliary power source, the vehicle including an exhaust gas purification catalyst disposed in a main exhaust passage, the method comprising the steps of:

when the catalyst is in a non-activated state, routing exhaust gas from the engine to bypass the main exhaust passage and to flow into an adsorbent arranged in a bypass, the adsorbent adsorbing unburnt fuel components in the exhaust gas when an adsorbent temperature is lower than a predetermined temperature and ejecting the adsorbed unburnt fuel components when the adsorbent temperature is at least the predetermined temperature;

after activation of the catalyst, routing a majority of the exhaust gas into the main exhaust passage and causing a negligible amount of the exhaust gas to bypass the main exhaust passage;

storing oxygen in the catalyst by discharging from the engine exhaust gas including excess oxygen; and controlling the auxiliary power source to assist the engine in driving the vehicle.

* * * * *